(12) United States Patent
Trukhan et al.

(10) Patent No.: US 9,764,313 B2
(45) Date of Patent: Sep. 19, 2017

(54) MOLECULAR SIEVE CATALYST COMPOSITIONS, CATALYST COMPOSITES, SYSTEMS, AND METHODS

(71) Applicant: BASF Corporation, Florham Park, NJ (US)

(72) Inventors: Natalia Trukhan, Ludwigshafen (DE); Ulrich Müller, Neustadt (DE); Michael Breen, Erie, PA (US); Barbara Slawski, North Royalton, OH (US); Qi Fu, Solon, OH (US); Jaya L. Mohanan, Edison, NJ (US); Martin W. Kraus, Westfield, NJ (US); Ahmad Moini, Princeton, NJ (US); Xiaofan Yang, Highland Park, NJ (US); John K. Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/741,754

(22) Filed: Jun. 17, 2015

(65) Prior Publication Data

US 2015/0367336 A1  Dec. 24, 2015

Related U.S. Application Data

(63) Continuation-in-part of application No. 14/687,097, filed on Apr. 15, 2015.
(Continued)

(51) Int. Cl.
*B01J 29/76* (2006.01)
*B01J 37/02* (2006.01)
(Continued)

(52) U.S. Cl.
CPC ........ *B01J 29/763* (2013.01); *B01D 53/8628* (2013.01); *B01D 53/9418* (2013.01);
(Continued)

(58) Field of Classification Search
None
See application file for complete search history.

(56) References Cited

U.S. PATENT DOCUMENTS 4,544,538 A    10/1985  Zones
4,707,345 A    11/1987  Lok et al.
(Continued)

FOREIGN PATENT DOCUMENTS

DE    102010055680    6/2012
WO    WO-2008/106519    9/2008
(Continued)

OTHER PUBLICATIONS

Bleken, Francesca et al., The Effect of Acid Strength on the Conversion of Methanol to Olefins Over Acidic Microporous Catalysts with the CHA Topology, Topics in Catalysis vol. 52 Issue 3 2009, 218-228.
(Continued)

*Primary Examiner* — Melvin C Mayes
*Assistant Examiner* — Sheng H Davis
(74) *Attorney, Agent, or Firm* — Womble Carlyle Sandridge & Rice LLP

(57) ABSTRACT

Described is a selective catalytic reduction material comprising a spherical particle including an agglomeration of crystals of a molecular sieve. The catalyst is a crystalline material that is effective to catalyze the selective catalytic reduction of nitrogen oxides in the presence of a reductant at temperatures between 200° C. and 600° C. A method for selectively reducing nitrogen oxides and an exhaust gas treatment system are also described.

24 Claims, 24 Drawing Sheets

Related U.S. Application Data

(60) Provisional application No. 62/081,243, filed on Nov. 18, 2014, provisional application No. 62/013,847, filed on Jun. 18, 2014.

(51) Int. Cl.
*B01J 35/08* (2006.01)
*B01J 35/02* (2006.01)
*B01D 53/94* (2006.01)
*B01D 53/86* (2006.01)
*B01J 35/00* (2006.01)

(52) U.S. Cl.
CPC ........ *B01D 53/9477* (2013.01); *B01J 35/002* (2013.01); *B01J 35/023* (2013.01); *B01J 35/08* (2013.01); *B01J 37/0228* (2013.01); *B01J 37/0246* (2013.01); *B01D 53/9427* (2013.01); *B01D 2251/208* (2013.01); *B01D 2251/2062* (2013.01); *B01D 2251/2067* (2013.01); *B01D 2253/1085* (2013.01); *B01D 2255/104* (2013.01); *B01D 2255/209* (2013.01); *B01D 2255/2063* (2013.01); *B01D 2255/2065* (2013.01); *B01D 2255/2073* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/40* (2013.01); *B01D 2255/407* (2013.01); *B01D 2255/50* (2013.01); *B01D 2255/904* (2013.01); *B01D 2255/9032* (2013.01); *B01D 2255/911* (2013.01); *B01D 2255/9202* (2013.01); *B01D 2255/9205* (2013.01); *B01D 2255/9207* (2013.01); *B01D 2257/402* (2013.01); *B01D 2257/404* (2013.01); *B01D 2257/406* (2013.01); *B01D 2258/012* (2013.01); *Y02C 20/10* (2013.01)

(56) References Cited

U.S. PATENT DOCUMENTS

| | | | |
|---|---|---|---|
| 4,867,954 A * | 9/1989 | Staniulis | B01D 53/8625 423/239.1 |
| 4,869,805 A | 9/1989 | Lok et al. | |
| 5,160,717 A | 11/1992 | Lok et al. | |
| 5,271,761 A | 12/1993 | Skeels | |
| 5,474,754 A | 12/1995 | Saxton et al. | |
| 5,516,497 A | 5/1996 | Speronello et al. | |
| 5,518,708 A | 5/1996 | Skeels et al. | |
| 5,695,736 A | 12/1997 | Saxton et al. | |
| 5,993,764 A | 11/1999 | Tabata et al. | |
| 6,709,644 B2 | 3/2004 | Zones et al. | |
| 7,029,650 B1 | 4/2006 | Juttu et al. | |
| 7,074,734 B2 | 7/2006 | Vu et al. | |
| 7,601,662 B2 | 10/2009 | Bull et al. | |
| 8,404,203 B2 | 3/2013 | Bull et al. | |
| 8,535,629 B2 | 9/2013 | Ballinger et al. | |
| 9,011,807 B2 | 4/2015 | Mohanan et al. | |
| 9,126,180 B2 | 9/2015 | Fedeyko et al. | |
| 2004/0266607 A1 * | 12/2004 | Zhou | C10G 11/02 502/60 |
| 2007/0071666 A1 * | 3/2007 | Larsen | B01J 29/035 423/351 |
| 2007/0117737 A1 * | 5/2007 | Artiga Gonzalez | C11D 3/10 510/446 |
| 2007/0244000 A1 | 10/2007 | Molinier et al. | |
| 2008/0045767 A1 | 2/2008 | Cao et al. | |
| 2008/0233031 A1 | 9/2008 | Yuen et al. | |
| 2008/0241034 A1 | 10/2008 | Schwefer et al. | |
| 2008/0293989 A1 | 11/2008 | Khanmamedova et al. | |
| 2009/0129995 A1 * | 5/2009 | Pfeifer | B01J 23/42 422/180 |
| 2009/0214397 A1 * | 8/2009 | Shirono | B01D 53/9431 422/177 |
| 2010/0187156 A1 | 7/2010 | Prentice et al. | |
| 2011/0130579 A1 | 6/2011 | Müller et al. | |
| 2011/0146237 A1 | 6/2011 | Adelmann et al. | |
| 2012/0004485 A1 | 1/2012 | Jan et al. | |
| 2012/0010453 A1 | 1/2012 | Ohkubo et al. | |
| 2012/0039759 A1 | 2/2012 | Narula et al. | |
| 2012/0238792 A1 | 9/2012 | Watson et al. | |
| 2012/0244066 A1 | 9/2012 | Bull et al. | |
| 2012/0255377 A1 | 10/2012 | Kamakoti et al. | |
| 2012/0258032 A1 | 10/2012 | Phillips et al. | |
| 2012/0275977 A1 | 11/2012 | Chandler | |
| 2012/0301378 A1 | 11/2012 | Fedeyko et al. | |
| 2013/0052125 A1 | 2/2013 | Moini et al. | |
| 2013/0090234 A1 | 4/2013 | Yilmaz et al. | |
| 2013/0136677 A1 | 5/2013 | Chandler et al. | |
| 2013/0195731 A1 | 8/2013 | Bull et al. | |
| 2013/0224082 A1 * | 8/2013 | Narula | B01D 53/9418 422/180 |
| 2013/0334460 A1 | 12/2013 | Sauerbeck et al. | |
| 2013/0336863 A1 | 12/2013 | Soeger et al. | |
| 2014/0072508 A1 | 3/2014 | Sauerbeck et al. | |
| 2015/0367337 A1 | 12/2015 | Yang et al. | |

FOREIGN PATENT DOCUMENTS

| | | |
|---|---|---|
| WO | WO-2010/099650 | 9/2010 |
| WO | WO-2010/099651 | 9/2010 |
| WO | WO 2012/085150 | 6/2012 |
| WO | WO-2012/085157 | 6/2012 |

OTHER PUBLICATIONS

Eilertsen, Einar et al., Synthesis of Titanium Chabazite: A New Shape Selective Oxidation Catalyst, *ChemCatChem* vol. 3 2011, 1869-1871.

Suaerbeck, Silke, A New Type of SCR Formulation With Broad Operation Range, *Clariant* Stationary Emission Control/ Environmental Zeolites Jun. 6, 2013, 18 Pages.

Fickel, D. W., and Lobo, R. F., "Cooper coordination in Cu-SSZ-13 and Cu-SSZ-16 investigated by variable-temperature XRD," Journal of Physical Chemistry C., 2010, pp. 1633-1640, vol. 114(3).

Kunitake, Y., et al. "Synthesis of titanated chabazite with enhanced thermal stability by hydrothermal conversation of titanated faujasite," Microporous and Mesoporous Materials, Oct. 2015, pp. 56-66, vol. 215.

* cited by examiner

MOLECULAR SIEVE CATALYST COMPOSITIONS, CATALYST COMPOSITES, SYSTEMS, AND METHODS

CROSS-REFERENCE TO RELATED APPLICATIONS

This application claims the benefit of priority under 35 U.S.C. §119(e) to U.S. Provisional Application 62/013,847, filed Jun. 18, 2014, and to U.S. Provisional Application No. 62/081,243, filed Nov. 18, 2014, and is a continuation-in-part of U.S. application Ser. No. 14/687,097, filed Apr. 15, 2015, the disclosures of which are herein incorporated by reference in their entireties.

TECHNICAL FIELD

The present invention relates generally to the field of selective catalytic reduction materials, selective catalytic reduction composites, and to methods of selectively reducing nitrogen oxides. More particularly, embodiments of the invention relate to a SCR catalyst material comprising a spherical particle including an agglomeration of crystals of a molecular sieve.

BACKGROUND

Over time, the harmful components of nitrogen oxides ($NO_x$) have led to atmospheric pollution. $NO_x$ is contained in exhaust gases such as from internal combustion engines (e.g., automobiles and trucks), from combustion installations (e.g., power stations heated by natural gas, oil, or coal), and from nitric acid production plants.

Various methods have been used in the treatment of $NO_x$-containing gas mixtures. One type of treatment involves catalytic reduction of nitrogen oxides. There are two processes: (1) a nonselective reduction process wherein carbon monoxide, hydrogen, or a lower hydrocarbon is used as a reducing agent, and (2) a selective reduction process wherein ammonia or ammonia precursor is used as a reducing agent. In the selective reduction process, a high degree of removal with nitrogen oxide can be obtained with a small amount of reducing agent.

The selective reduction process is referred to as a SCR process (Selective Catalytic Reduction). The SCR process uses catalytic reduction of nitrogen oxides with ammonia in the presence of atmospheric oxygen with the formation predominantly of nitrogen and steam:

$4NO+4NH_3+O_2 \rightarrow 4N_2+6H_2O$ (standard SCR reaction)

$2NO_2+4NH_3 \rightarrow 3N_2+6H_2O$ (slow SCR reaction)

$NO+NO_2+NH_3 \rightarrow 2N_2+3H_2O$ (fast SCR reaction)

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures, have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. Iron-promoted zeolite beta has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

Metal-promoted, particularly copper promoted aluminosilicate zeolites having the CHA structure type have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the current catalysts exhibit excellent properties, there is a continuing desire to reduce $N_2O$ make during the SCR reaction. Accordingly, an SCR catalyst is needed with improved $NO_x$ conversion efficiency and lower $N_2O$ make relative to the current technologies.

SUMMARY

A first aspect of the invention is directed to a selective catalytic reduction (SCR) material. In a first embodiment, a selective catalytic reduction material comprises a spherical particle including an agglomeration of crystals of a molecular sieve, wherein the spherical particle has a median particle size in the range of about 0.5 to about 5 microns.

In a second embodiment, the SCR catalyst material of the first embodiment is modified, wherein the molecular sieve comprises a d6r unit.

In a third embodiment, the SCR catalyst material of the first and second embodiments is modified, wherein the molecular sieve has a structure type selected from the group consisting of AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a fourth embodiment, the SCR catalyst material of the first through third embodiments is modified, wherein the molecular sieve has a structure type selected from AEI, AFT, AFX, CHA, EAB, ERI, KFI, LEV, SAS, SAT, and SAV.

In a fifth embodiment, the SCR catalyst material of the first through fourth embodiments is modified, wherein the molecular sieve has a structure type selected from AEI, CHA, and AFX.

In a sixth embodiment, the SCR catalyst material of the first through fifth embodiments, wherein the molecular sieve has the CHA structure type.

In a seventh embodiment, the SCR catalyst material of the first through sixth embodiments is modified, wherein the molecular sieve having the CHA structure type is selected from an aluminosilicate zeolite, a borosilicate, a gallosilicate, a SAPO, an AlPO, a MeAPSO, and a MeAPO.

In an eighth embodiment, the SCR catalyst material of the first through seventh embodiments is modified, wherein the molecular sieve having the CHA structure type is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

In a ninth embodiment, the SCR catalyst material of the first through eighth embodiments is modified, wherein the molecular sieve is selected from SSZ-13 and SSZ-62.

In a tenth embodiment, the SCR catalyst material of the first through ninth embodiments is modified, wherein the molecular sieve is promoted with a metal selected from Cu, Fe, Co, Ni, La, Ce, Mn, V, Ag, and combinations thereof.

In an eleventh embodiment, the SCR catalyst material of the first through tenth embodiments is modified, wherein the molecular sieve is promoted with a metal selected from Cu, Fe, and combinations thereof.

In a twelfth embodiment, the SCR catalyst material of the first through eleventh embodiments is modified, wherein the SCR catalyst material is effective to catalyze the selective catalytic reduction of nitrogen oxides in the presence of a reductant at temperatures between 200° C. and 600° C.

In a thirteenth embodiment, the SCR catalyst material of the sixth embodiment is modified, wherein the molecular sieve having the CHA structure type has a silica to alumina ratio in the range of 10 to 100.

In a fourteenth embodiment, the SCR catalyst material of the tenth and eleventh embodiments is modified, wherein the metal is present in an amount in the range of about 0.1 to about 10 wt. % on an oxide basis.

In a fifteenth embodiment, the SCR catalyst material of the first through fourteenth embodiments is modified, wherein the spherical particle has a median particle size in the range of about 1.2 to about 3.5 microns.

In a sixteenth embodiment, the SCR catalyst material of the first through fifteenth embodiments is modified, wherein the crystals have a crystal size in the range of about 1 to about 250 nm.

In a seventeenth embodiment, the SCR catalyst material of the first through sixteenth embodiments is modified, wherein the crystals have a crystal size in the range of about 100 to about 250 nm.

In an eighteenth embodiment, the SCR catalyst material of the first through seventeenth embodiments is modified, wherein the SCR catalyst material is in the form of a washcoat.

In a nineteenth embodiment, the SCR catalyst material of the eighteenth embodiment is modified, wherein the washcoat is a layer deposited on a substrate.

In a twentieth embodiment, the SCR catalyst material of nineteenth embodiment is modified, wherein the substrate comprises a filter.

In a twenty-first embodiment, the SCR catalyst material of the twentieth embodiment is modified, wherein the filter is a wall flow filter.

In a twenty-second embodiment, the SCR catalyst material of the twentieth embodiment is modified, wherein the filter is a flow through filter.

In a twenty-third embodiment, the SCR catalyst material of the first through twenty-second embodiments is modified, wherein at least 80% of the spherical particles have a median particle size in the range of 0.5 to 2.5 microns.

In a twenty-fourth embodiment, the SCR catalyst material of the first through twenty-third embodiments is modified, wherein the molecular sieve comprises a zeolitic framework material of silicon and aluminum atoms, wherein a fraction of the silicon atoms are isomorphously substituted with a tetravalent metal.

In a twenty-fifth embodiment, the SCR catalyst material of the twenty-fourth embodiment is modified, wherein the molecular sieve is promoted with a metal selected from Cu, Fe, Co, Ni, La, Ce, Mn, V, Ag, and combinations thereof.

In a twenty-sixth embodiment, the SCR catalyst material of the twenty-twenty fourth and twenty-fifth embodiments is modified, wherein the tetravelent metal comprises a tetravalent transition metal.

In a twenty-seventh embodiment, the SCR catalyst material of the twenty-fourth through twenty-sixth embodiments is modified, wherein the tetravalent transition metal is selected from the group consisting of Ti, Zr, Hf, Ge, and combinations thereof.

In a twenty-eighth embodiment, the SCR catalyst material of the twenty-fourth through twenty-seventh embodiments is modified, wherein the tetravalent transition metal comprises Ti.

A second aspect of the invention is directed to a method for selectively reducing nitrogen oxide ($NO_x$). In a twenty-ninth embodiment, the method for selectively reducing nitrogen oxide ($NO_x$) comprises contacting an exhaust gas stream containing $NO_x$ with a SCR catalyst material comprising a spherical particle including an agglomeration of crystals of a molecular sieve, wherein the spherical particle has a median particle size in the range of about 0.5 to about 5 microns. In other embodiments, the method for selectively reducing nitrogen oxide ($NO_x$) comprises contacting an exhaust gas stream containing $NO_x$ with the SCR catalyst material of the first through twenty-eighth embodiments.

A third aspect of the invention is direct to a system for treating exhaust gas from a lean burn engine containing $NO_x$. In a thirtieth embodiment, the system for treating exhaust gas from a lean burn engine containing $NO_x$ comprises the SCR catalyst material of the first through twenty-eighth embodiments and at least one other exhaust gas treatment component.

A thirty-first embodiment pertains to SCR catalyst comprising a zeolitic framework material of silicon and aluminum atoms, wherein a fraction of the silicon atoms are isomorphously substituted with a tetravalent metal and the catalyst is promoted with a metal selected from Cu, Fe, Co, Ni, La, Ce, Mn, V, Ag, and combinations thereof.

In a thirty-second embodiment, the SCR catalyst of the thirty-first embodiment is modified, wherein the tetravalent metal comprises a tetravalent transition metal.

In a thirty-third embodiment, the SCR catalyst of the thirty-first and thirty-second embodiments is modified, wherein the tetravalent transition metal is selected from the group consisting of Ti, Zr, Hf, Ge, and combinations thereof.

In a thirty-fourth embodiment, the SCR catalyst of the thirty-first through thirty-third embodiments is modified, wherein the tetravalent transition metal comprises Ti.

In a thirty-fifth embodiment, the SCR catalyst of the thirty-first through thirty-fourth embodiments is modified, wherein the silica to alumina ratio is in the range of 1 to 300.

In a thirty-sixth embodiment, the SCR catalyst of the thirty-first through thirty-fifth embodiments is modified, wherein the silica to alumina ratio is in the range of 1 to 50.

In a thirty-seventh embodiment, the SCR catalyst of the thirty-first through thirty-sixth embodiments is modified, wherein the tetravalent metal to alumina ratio is in the range of 0.0001 to 1000.

In a thirty-eighth embodiment, the SCR catalyst of the thirty-first through thirty-seventh embodiments is modified, wherein the tetravalent metal to alumina ratio is in the range of 0.01 to 10.

In a thirty-ninth embodiment, the SCR catalyst of the thirty-first through thirty-eighth embodiments is modified, wherein the tetravalent metal to alumina ratio is in the range of 0.01 to 2.

In a fortieth embodiment, the SCR catalyst of the thirty-first through thirty-ninth embodiments is modified, wherein the silica to tetravalent metal ratio is in the range of 1 to 100.

In a forty-first embodiment, the SCR catalyst of the thirty-first through a fortieth embodiment is modified, wherein the silica to tetravalent metal ratio is in the range of 5 to 20.

In a forty-second embodiment, the SCR catalyst of the thirty-first through forty-first embodiments if modified, wherein the zeolitic framework material comprises ring sizes no larger than 12.

In a forty-third embodiment, the SCR catalyst of the thirty-first through forty-second embodiments is modified, wherein the zeolitic framework material comprises a d6r unit.

In a forty-fourth embodiment, the SCR catalyst of the thirty-first through forty-third embodiments is modified, wherein the zeolitic framework material is selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a forty-fifth embodiment, the SCR catalyst of the thirty-first through forty-fourth embodiments is modified, wherein the zeolitic framework material is selected from AEI, CHA, AFX, ERI, KFI, LEV, and combinations thereof.

In a forty-sixth embodiment, the SCR catalyst of the thirty-first through forty-fifth embodiments is modified, wherein the zeolitic framework material is selected from AEI, CHA, and AFX.

In a forty-seventh embodiment, the SCR catalyst of the thirty-first through forty-sixth embodiments is modified, wherein the zeolitic framework material is CHA.

In a forty-eighth embodiment, the SCR catalyst of the thirty-first through forty-seventh embodiments is modified, wherein the catalyst is promoted with Cu, Fe, and combinations thereof.

In a forty-ninth embodiment, the SCR catalyst of the thirty-first through forty-eighth embodiments is modified, wherein the catalyst is effective to promote the formation of $NO^+$.

In a fiftieth embodiment, the SCR catalyst of the thirty-first through forty-ninth embodiments is modified with the proviso that the zeolitic framework excludes phosphorous atoms.

Embodiments of an additional aspect of the invention are directed to a method for selectively reducing nitrogen oxides ($NO_x$). In a fifty-first embodiment, the method for selectively reducing nitrogen oxides ($NO_x$) comprises contacting an exhaust gas stream containing $NO_x$ with a catalyst of the thirty-first through fiftieth embodiments.

Embodiments of a further aspect of the invention are directed to an exhaust gas treatment system. In a fifty-second embodiment, an exhaust gas treatment system comprises an exhaust gas stream containing ammonia and a catalyst in accordance with the thirty-first through fiftieth embodiments.

In another aspect, a fifty-third embodiment is provided directed to use of the catalyst of any of the first through fiftieth embodiments as a catalyst for the selective catalytic reduction of $NO_x$ in the presence of ammonia.

A fifty-fourth embodiment pertains to SCR catalyst composite comprising a SCR catalyst material that promotes the reaction of ammonia with nitrogen oxides to form nitrogen and $H_2O$ selectively over a temperature range of 150° C. to 600° C.; and an ammonia storage material comprising a transition metal having an oxidation state of IV, the SCR catalyst material effective to store ammonia at 400° C. and above with a minimum $NH_3$ storage of 0.1 g/L at 400° C.

In a fifty-fifth embodiment, the SCR catalyst composite of the fifty-fourth embodiment is modified, wherein the transition metal is selected from the group consisting of Ti, Ce, Zr, Hf, Ge, and combinations thereof.

In a fifty-sixth embodiment, the SCR catalyst composite the fifty-fourth and fifty-fifth embodiments is modified, wherein the SCR catalyst material is isomorphously substituted with the ammonia storage material.

In a fifty-seventh embodiment, the SCR catalyst composite of the fifty-fourth and fifty-fifth embodiments is modified, wherein the ammonia storage material is dispersed in the SCR catalyst material.

In a fifty-eighth embodiment, the SCR catalyst composite of the fifty-fourth and fifty-fifth embodiments is modified, wherein the ammonia storage material is dispersed as a layer on the SCR catalyst material.

In a fifty-ninth embodiment, the SCR catalyst composite of the fifty-fourth and fifty-fifth embodiments is modified, wherein the ammonia storage material and the SCR catalyst material are arranged in a zoned configuration.

In a sixtieth embodiment, the SCR catalyst composite of the fifty-ninth embodiment is modified, wherein the ammonia storage material is upstream of the SCR catalyst material.

In a sixty-first embodiment, the SCR catalyst composite of the fifty-fourth and fifty-fifth embodiments is modified, wherein the SCR catalyst material is ion-exchanged with the ammonia storage material.

In a sixty-second embodiment, the SCR catalyst composite of the fifty-fourth through sixty-first embodiments is modified, wherein the SCR catalyst material is disposed on a filter.

In a sixty-third embodiment, the SCR catalyst composite of the sixty-second embodiment is modified, wherein the filter is a wall flow filter.

In a sixty-fourth embodiment, the SCR catalyst composite of the sixty-second embodiment is modified, wherein the filter is a flow through filter.

In a sixty-fifth embodiment, the SCR catalyst composite of the fifty-fourth through sixty-fourth embodiments is modified, wherein the SCR catalyst material comprises one or more of a molecular sieve, a mixed oxide, and an activated refractory metal oxide support.

In a sixty-sixth embodiment, the SCR catalyst composite of the sixty-fifth embodiment is modified, wherein the mixed oxide is selected from Fe/titania, Fe/alumina, Mg/titania, Mg/alumina, Mn/alumina, Mn/titania, Cu/titania, Ce/Zr, Ti/Zr, vanadia/titania, and mixtures thereof.

In a sixty-seventh embodiment, the SCR catalyst composite of the sixty-fifth and sixty-sixth embodiments is modified, wherein the mixed oxide comprises vanadia/titania and is stabilized with tungsten.

In a sixty-eighth embodiment, the SCR catalyst composite of the sixty-fifth embodiment is modified, wherein the molecular sieve has a framework of silicon, phosphorus and aluminum atoms.

In a sixty-ninth embodiment, the SCR catalyst composite of the sixty-eighth embodiment is modified, wherein the silica to alumina ratio is in the range of 1 to 300.

In a seventieth embodiment, the SCR catalyst composite of the sixty-eighth and sixty-ninth embodiments is modified, wherein the silica to alumina ratio is in the range of 1 to 50.

In a seventy-first embodiment, the SCR catalyst composite of sixty-eighth through seventieth embodiments is modified, wherein the ratio of alumina to the tetravalent metal is in the range of 1:10 to 10:1.

In a seventy-second embodiment, the SCR catalyst composite of the sixty-eighth through seventy-first embodiments is modified, wherein a fraction of the silicon ions are isomorphously substituted with the metal of the ammonia storage material.

In a seventy-third embodiment, the SCR catalyst composite of the sixty-fifth embodiment is modified, wherein the molecular sieve comprises ring sizes no larger than 12.

In a seventy-second embodiment, the SCR catalyst composite of the sixty-fifth through seventy-third embodiments is modified, wherein the molecular sieve has a structure type selected from the group consisting of MFI, BEA, AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a seventy-third embodiment, the SCR catalyst composite of the seventy-second embodiment is modified, wherein the molecular sieve has a structure type selected from the group consisting of MFI, BEA, CHA, AEI, AFX, ERI, KFI, LEV, and combinations thereof.

In a seventy-fourth embodiment, the SCR catalyst composite of the seventy-third embodiment is modified, wherein the molecular sieve has a structure type selected from the group consisting of AEI, CHA, AFX, and combinations thereof.

In a seventy-fifth embodiment, the SCR catalyst composite of the fifty-fourth through seventy-fourth embodiments is modified, wherein the SCR catalyst material is promoted with a metal selected from Cu, Fe, Co, Ni, La, Ce, Mn, V, Ag, and combinations thereof.

In a seventy-sixth embodiment, the SCR catalyst composite of the fifty-fourth through seventy-fourth embodiments is modified, wherein the SCR catalyst material is promoted with Cu, Fe, and combinations thereof.

In a seventy-seventh embodiment, the SCR catalyst composite of the sixty-fifth embodiment is modified, wherein the molecular sieve comprises SSZ-13, SSZ-39, or SAPO-34.

In a seventy-eighth embodiment, the SCR catalyst composite of the sixty-fifth embodiment is modified, wherein the activated refractory metal oxide support is selected from alumina, ceria, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, alumina-chomia, alumina-ceria, zirconia-silica, titania-silica, or zirconia-titania, and combinations thereof.

In a seventy-ninth embodiment, the SCR catalyst composite of the seventy-eighth embodiment is modified, wherein the activated refractory metal oxide support is exchanged with a metal selected from the group consisting of Cu, Fe, Co, Ni, La, Ce, Mn, V, Ag, and combinations thereof.

In an eightieth embodiment, the SCR catalyst composite of the sixty-fifth embodiment is modified, wherein the transition metal comprises Ti.

In an eighty-first embodiment, the SCR catalyst composite of the eightieth embodiment is modified, wherein the ratio of alumina to titanium is in the range of 1:10 to 10:1.

A further aspect of the present invention is directed to a method. In an eighty-second embodiment, a method for simultaneously selectively reducing nitrogen oxide ($NO_x$) and storing ammonia comprises contacting an exhaust gas stream containing $NO_x$ with the SCR catalyst composite of the fifty-fourth through eighty-first embodiments.

In an eighty-third embodiment, the method of the eighty-second embodiment is modified, wherein the oxygen content of the exhaust gas stream is from 1 to 30% and the water content of the exhaust gas stream is from 1 to 20%.

An additional aspect of the present invention is directed to a SCR catalyst composite. In an eighty-fourth embodiment, a SCR catalyst composite comprises a SCR catalyst material that effectively promotes the reaction of ammonia with nitrogen oxides to form nitrogen and $H_2O$ selectively over a temperature range of 200° C. to 600° C., wherein the SCR catalyst material comprises SSZ-13; and an ammonia storage material comprising Ti, the ammonia storage material effective to store ammonia at 400° C. and above.

DETAILED DESCRIPTION

Figure 1:
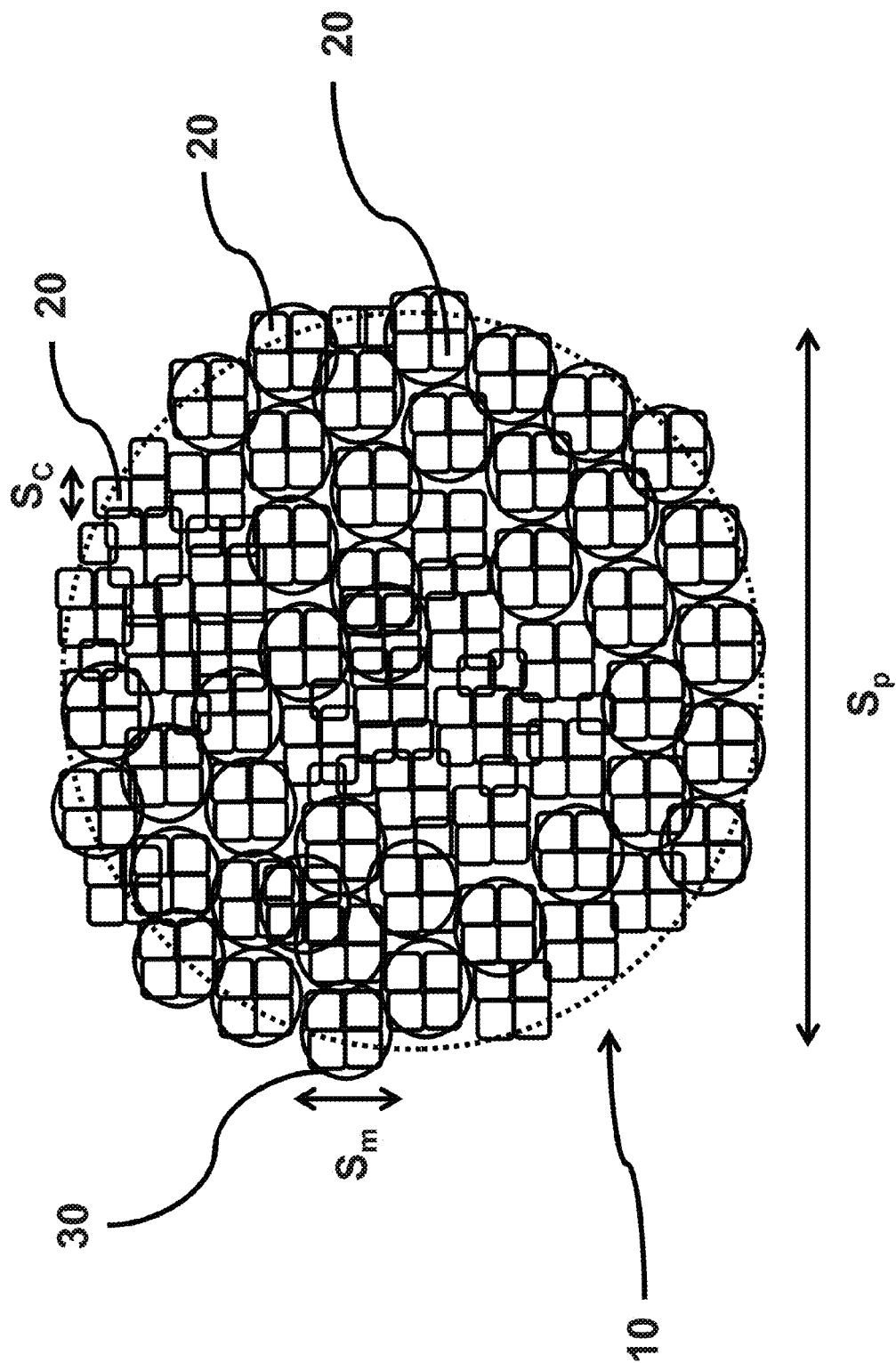
FIG. 1 is a schematic of a cross-section of a SCR catalyst material according to one or more embodiments.

Before describing several exemplary embodiments of the invention, it is to be understood that the invention is not limited to the details of construction or process steps set forth in the following description. The invention is capable of other embodiments and of being practiced or being carried out in various ways.

Governmental regulations mandate the use of $NO_x$ reduction technologies for light and heavy-duty vehicles. Selective catalytic reduction (SCR) of $NO_x$ using urea is an effective and dominant emission control technology for $NO_x$ control. To meet governmental regulations, an SCR catalyst that has improved performance compared to the current Cu-SSZ-13 based benchmark technology is necessary. Provided is an SCR catalyst material having improved $NO_x$ conversion efficiency and lower $N_2O$ make relative to the current Cu-SSZ-13 based benchmark technologies. The SCR catalyst material effectively promotes the reaction of ammonia with nitrogen oxides to form nitrogen and $H_2O$ selectively over a temperature range of 200 to 600° C.

Embodiments of the invention are directed to a selective catalytic reduction material comprising a spherical particle including an agglomeration of crystals of a molecular sieve. It was surprisingly found that spherical particles having an agglomeration of crystals of a molecular sieve are particularly suitable in exhaust gas purification catalyst components, in particular as SCR catalyst materials.

With respect to the terms used in this disclosure, the following definitions are provided.

As used herein, the term "catalyst" or "catalyst composition" or "catalyst material" refers to a material that promotes a reaction.

As used herein, the term "catalytic article" or "catalyst composite" refers to an element that is used to promote a desired reaction. For example, a catalytic article or catalyst composite may comprise a washcoat containing a catalytic species, e.g. a catalyst composition, on a substrate.

As used herein, the term "selective catalytic reduction" (SCR) refers to the catalytic process of reducing oxides of nitrogen to dinitrogen ($N_2$) using a nitrogenous reductant.

As used herein, the term "FTIR" refers to Fourier transform infrared spectroscopy, which is a technique used to obtain an infrared spectrum of absorption, emission, photoconductivity or Raman scattering of a solid, liquid, or gas.

As used herein, the term "ATR" refers to attenuated total reflectance, which is a sampling technique used in conjunction with infrared spectroscopy, particularly FTIR, which enables samples to be examined directly in the solid or liquid state without further preparation.

According to one or more embodiments, a selective catalytic reduction catalyst material comprises a spherical particle including an agglomeration of crystals of a molecular sieve, wherein the spherical particle has a median particle size in the range of about 0.5 to about 5 microns.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their structure type, it is intended to include the structure type and any and all isotypic framework materials such as SAPO, ALPO and MeAPO materials having the same structure type as the zeolite materials.

In more specific embodiments, reference to an aluminosilicate zeolite structure type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g. zeolite, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In an exemplary embodiment, the molecular sieve can be isomorphously substituted. As used herein, the terms "zeolitic framework" and "zeolitic framework material" refer to a specific example of a molecular sieve, further including silicon and aluminum atoms. According to embodiments of the invention, the molecular sieve comprises a zeolitic framework material of silicon (Si) and aluminum (Al) ions, wherein a fraction of the silicon atoms are isomorphously substituted with a tetravalent metal. In specific embodiments, the framework does not include phosphorous (P) atoms.

As used herein, the terms "isomorphously substituted" and "isomorphous substitution" refer to the substitution of one element for another in a mineral without a significant change in the crystal structure. Elements that can substitute for each other generally have similar ionic radii and valence state. In one or more embodiments, a fraction of the silicon atoms are isomorphously substituted with a tetravalent metal. In other words, a fraction of the silicon atoms in the zeolitic framework material are being replaced with a tetravalent metal. Such isomorphous substitution does not significantly alter the crystal structure of the zeolitic framework material.

As used herein, the term "tetravalent metal" refers to a metal having a state with four electrons available for covalent chemical bonding in its valence (outermost electron shell). Tetravalent metals include germanium (Ge) and those transition metals located in Group 4 of the periodic table, titanium (Ti), zirconium (Zr), and hafnium (Hf). In one or more embodiments, the tetravalent metal is selected from Ti, Zr, Hf, Ge, and combinations thereof. In specific embodiments, the tetravalent metal comprises Ti.

In other embodiments, a fraction of the silicon atoms are isomorphously substituted with a transition metal having an oxidation state of IV. Without intending to be bound by theory, it is thought that the presence of an element with a formal oxidation state of IV helps to increase ammonia storage at high temperature. In one or more embodiments, the transition metal having an oxidation state of IV can either be in oxide form, or intrinsically embedded in the SCR catalyst material. As used herein, the term "transition metal having an oxidation state of IV" refers to a metal having a state with four electrons available for covalent chemical bonding in its valence (outermost electron shell). Transition metals having an oxidation state of IV include germanium (Ge), cerium (Ce), and those transition metals located in Group 4 of the periodic table, titanium (Ti), zirconium (Zr), and hafnium (Hf). In one or more embodiments, the transition metal having an oxidation state of IV is selected from Ti, Ce, Zr, Hf, Ge, and combinations thereof. In specific embodiments, the transition metal having an oxidation state of IV comprises Ti.

In one or more embodiments, the zeolitic framework material comprises $MO_4/SiO_4/AlO_4$ tetrahedra (where M is a tetravalent metal) and is linked by common oxygen atoms to form a three-dimensional network. The isomorphously substituted tetravalent metals are embedded into the zeolitic framework material as a tetrahedral atom ($MO_4$). The isomorphously substituted tetrahedron units together with the silicon and aluminum tetrahedron units then form the framework of the zeolitic material. In specific embodiments, the tetravalent metal comprises titanium, and the zeolitic framework material includes $TiO_4/SiO_4/AlO_4$ tetrahedra. Thus, in one or more embodiments, the catalyst comprises a zeolitic framework of silicon and aluminum atoms, wherein a fraction of the silicon atoms are isomorphously substituted with titanium.

The isomorphously substituted zeolitic framework material of one or more embodiments is differentiated mainly according to the geometry of the voids which are formed by the rigid network of the $MO_4/(SiO_4)/AlO_4$ tetrahedra (where M is a tetravalent metal).

In one or more embodiments, the molecular sieve comprises $SiO_4/AlO_4$ tetrahedra and is linked by common oxygen atoms to form a three-dimensional network. In other embodiments, the molecular sieve comprises $SiO_4/AlO_4/PO_4$ tetrahedra. The molecular sieve of one or more embodiments is differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 12, including 6, 8, 10, and 12.

According to one or more embodiments, the molecular sieve can be based on the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve comprises an 8-ring small pore aluminosilicate zeolite. As used herein, "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve comprises a d6r unit. Without intending to be bound by theory, in one or more embodiments, it is thought that the d6r unit promotes the formation of $NO^+$. Thus, in one or more embodiments, the molecular sieve has a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular sieve has a structure type selected from the group consisting of CHA, AEI, AFX, ERI, KFI, LEV, and combinations thereof. In still further specific embodiments, the molecular sieve has a structure type selected from CHA, AEI, and AFX. In one or more very specific embodiments, the molecular sieve has the CHA structure type.

Zeolitic chabazite includes a naturally occurring tectosilicate mineral of a zeolite group with approximate formula: $(Ca,Na_2,K_2,Mg)Al_2Si_4O_{12}\cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a molecular sieve having the chabazite crystal structure, silicoaluminophosphate 34 (SAPO-34), is described in U.S. Pat. No. 4,440,871 and U.S. Pat. No. 7,264,789, which are hereby incorporated by reference. A method of making yet another synthetic molecular sieve having chabazite structure, SAPO-44, is described in U.S. Pat. No. 6,162,415, which is hereby incorporated by reference.

In one or more embodiments, the molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve can vary over a wide range. In one or more embodiments, the molecular sieve component has a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50. In more specific embodiments, the molecular sieve having any of the immediately preceding SAR ranges, the spherical particle of the molecular sieve has a median particle size in the range of about 0.5 to about 5 microns, and more specifically, about 1.0 to about 3.5 microns, and the individual crystals of a molecular sieve have a crystal size in the range of about 100 to about 250 nm.

Isomorphous substitution of silicon with a tetravalent metal will affect the silica/alumina ratio of the zeolitic framework material. In one or more embodiments, the molecular sieve is isomorphously substituted with a tetravalent metal and has a silica to alumina molar ratio (SAR) in the range of 2 to 300, including 5 to 250; 5 to 200; 5 to 100; and 5 to 50. In one or more specific embodiments, the first and second molecular sieve, independently, have a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In embodiments where the molecular sieve is isomorphously substituted with a tetravalent metal, the ratio of tetravalent metal to alumina can vary over a very wide range. It is noted that this ratio is an atomic ratio, not a molar ratio. In one or more embodiments, the tetravalent metal to alumina ratio is in the range of 0.0001 to 10000, including 0.0001 to 10000, 0.001 to 1000, and 0.01 to 10. In other embodiments, the tetravalent metal to alumina ratio is in the range of 0.01 to 10, including 0.01 to 10, 0.01: to 5, 0.01 to 2, and 0.01 to 1. In specific embodiments, the tetravalent metal to alumina ratio is in the range of 0.01 to 2.

In specific embodiments where the molecular sieve is isomorphously substituted with a tetravalent metal, the tetravalent metal comprises titanium, and the titania to alumina ratio is in the range of 0.0001 to 10000, including 0.0001 to 10000, 0.001 to 1000, and 0.01 to 10. In other embodiments, the titania to alumina ratio is in the range of 0.01 to 10, including 0.01 to 10, 0.01: to 5, 0.01 to 2, and 0.01 to 1. In specific embodiments, the titania to alumina ratio is in the range of 0.01 to 2.

The ratio of silica to tetravalent metal can vary over a wide range. It is noted that this ratio is an atomic ratio, not a molar ratio. In one or more embodiments, the silica to tetravalent metal ratio is in the range of 1 to 100, including 1 to 50, 1 to 30, 1 to 25, 1 to 20, 5 to 20, and 10 to 20. In specific embodiments, the silica to tetravalent metal ratio is about 15. In one or more embodiments, the tetravalent metal comprises titanium, and the silica to titania ratio is in the range of 1 to 100, including 1 to 50, 1 to 30, 1 to 25, 1 to 20, 5 to 20, and 10 to 20. In specific embodiments, the silica to titania ratio is about 15.

Promoter Metals:

The molecular sieve of one or more embodiments may be subsequently ion-exchanged with one or more promoter metals such as iron, copper, cobalt, nickel, cerium or platinum group metals. Synthesis of zeolites and related micro- and mesoporous materials varies according to the structure type of the zeolitic material, but typically involves the combination of several components (e.g. silica, alumina, phosphorous, alkali, organic template etc.) to form a synthesis gel, which is then hydrothermally crystallized to form a final product. The structure directing agent can be in the form of an organic, i.e. tetraethylammonium hydroxide (TEAOH), or inorganic cation, i.e. $Na^+$ or $K^+$. During crystallization, the tetrahedral units organize around the SDA to form the desired framework, and the SDA is often embedded within the pore structure of the zeolite crystals. In one or more embodiments, the crystallization of the molecular sieve can be obtained by means of the addition of structure-directing agents/templates, crystal nuclei or elements. In some instances, the crystallization can be performed at temperatures of less than 100° C.

As used herein, "promoted" refers to a component that is intentionally added to the molecular sieve, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, a suitable metal is exchanged into the molecular sieve. According to one or more embodiments, the molecular sieve is promoted with a metal selected from Cu, Fe, Co, Ni, La, Ce, Mn, V, Ag, and combinations thereof. In specific embodiments, the molecular sieve is promoted with Cu, Fe, and combinations thereof.

The promoter metal content of the molecular sieve, calculated as the oxide, is, in one or more embodiments, at least about 0.1 wt. %, reported on a volatile-free basis. In specific embodiments, the promoter metal comprises Cu, and the Cu content, calculated as CuO is in the range of up to about 10 wt. %, including 9, 8, 7, 6, 5, 4, 3, 2, 1, 0.5, and 0.1 wt. %, in each case based on the total weight of the calcined molecular sieve reported on a volatile free oxide basis. In specific embodiments, the Cu content, calculated as CuO, is in the range of about 2 to about 5 wt. %. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 2 to 300, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 5 to 250, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 5 to 200, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 5 to 100, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 5 to 50, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 10 to 250, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 10 to 200, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 10 to 100, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 10 to 75, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 10 to 60, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 10 to 50, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 15 to 100, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 15 to 75, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 15 to 60, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 15 to 50, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 20 to 100, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 20 to 75, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 20 to 60, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

For specific molecular sieves having an SAR of 20 to 50, the Cu content may be in the range of 0.1-10 wt. %, or 0.5 to 8 wt. %, or 0.8 to 6 wt. %, or 1 to 4 wt. %, or even 2-3 wt. % in each case based on the total weight of the calcined molecular sieve reported on a volatile free oxide basis. In more specific embodiments, the molecular sieve having this specific combination of SAR and Cu content, the spherical particle of the molecular sieve has a median particle size in the range of about 0.5 to about 5 microns, and more specifically, about 1.2 to about 3.5 microns, and the individual crystals of a molecular sieve have a crystal size in the range of about 100 to about 250 nm.

Without intending to be bound by theory, it is thought that when the molecular sieve is isomorphously substituted with a tetravalent metal, the tetravalent metal is embedded into the zeolitic framework as a tetrahedral atom, allowing for close coupling to the active promoter metal center both structurally and electronically. In one or more embodiments, the promoter metal can be ion exchanged into the isomorphously substituted molecular sieve. In specific embodiments, copper is ion exchanged into the isomorphously substituted molecular sieve. The metal can be exchanged after the preparation or manufacture of the isomorphously substituted molecular sieve.

Porosity and Particle Shape and Size:

In one or more embodiments, the catalyst material comprises a spherical particle including an agglomeration of crystals of a molecular sieve. As used herein, the terms "agglomerate" or "agglomeration" refer to a cluster or collection of primary particles, i.e. crystals of molecular sieve.

In one or more embodiments, the spherical particle has a median particle size in the range of about 0.5 to about 5 microns, including 0.5, 0.6, 0.7, 0.8, 0.9, 1.0, 1.1, 1.2, 1.25, 1.3, 1.35, 1.4, 1.45, 1.5, 1.75, 2.0, 2.25, 2.5, 2.75, 3.0, 3.25, 3.5, 3.75, 4, 4.24, 4.5, 4.75, and 5 microns. The particle size of the spherical particle can be measured by a microscope, and more particularly a scanning electron microscope (SEM). In one or more specific embodiments, the spherical particle has a median particle size in the range of about 1.0 to about 5 microns, including a range of about 1.2 to about 3.5 microns. As used herein, the term "median particle size" refers to the median cross-sectional diameter of the spherical particles. In one or more embodiments, at least 80% of the spherical particles have a median particle size in the range of 0.5 to 2.5 microns.

In one or more embodiments, the individual crystals of molecular sieve have a crystal size in the range of about 1 to about 250 nm, including 1, 5, 10, 20, 30, 40, 50, 60, 70, 80, 90, 100, 110, 120, 130, 140, 150, 160, 170, 180, 190, 200, 210, 220, 230, 240, and 250 nm. The crystal size of the individual crystals of molecular sieve can be measured by a microscope, and more particularly a scanning electron microscope (SEM). In specific embodiments, the individual crystals of a molecular sieve have a crystal size in the range of about 100 to about 250 nm, or about 100 to about 200 nm. Generally, there are no specific restrictions as far as the shape of the individual crystals of molecular sieve is concerned. In one or more embodiments, the individual crystals of molecular sieve, without limitation, may be cubic, spherical, platelet, needle-like, isometric, octahedral, tetragonal, hexagonal, orthorhombic, trigonal, and the like, or any combination thereof.

Without intending to be bound by theory, in one or more embodiments, it is thought that the catalyst material has a monodispersed snowball structure. As used herein, a monodispersed snowball refers to an arrangement or collection of a number of individual molecular sieve crystals into a substantially spherical mass. As used herein, the term "monodispersed" means that the individual molecular sieve crystals are uniform and approximately the same size, having a crystal size in the range of about 1 to about 250 nanometers. The monodispersed snowball is similar to individual snow particles forming a snowball. In other embodiments, the catalyst material has a spherical snowball structure, wherein at least 80% of the spherical particle has a median particle size in the range of 0.5 to 2.5 microns.

In one or more embodiments, the individual crystals of molecular sieve form a microagglomerate, which then forms a macroagglomerated snowball structure. In one or more embodiments, the microagglomerates have a size in the range of less than 1.0 micron, including less than 0.9, less than 0.8, less than 0.7, less than 0.6, less than 0.5, less than 0.4, less than 0.3, less than 0.2, and less than 0.1 micron, and the macroagglomerate spherical snowball has a particle size in the range of about 0.5 to about 5 microns, including about 1.2 to about 3.5 microns. The size of the microagglomerates can be measured by a microscope, and more particularly a scanning electron microscope (SEM).

In one or more embodiments, the molecular sieve comprises an isomorphously substituted zeolitic framework material wherein a fraction of the silicon atoms are isomorphously substituted with a tetravalent metal. The isomorphously substituted zeolite framework material according to embodiments of the invention may be provided as a washcoat. The isomorphously substituted zeolitic framework material provides a washcoat that is generally very porous. The particle size of the isomorphously substituted zeolitic framework material is generally in the range of 1 to 2 μm. Additionally, without intending to be bound by theory, it is thought that the presence of the tetravalent metal, specifically titanium, controls the zeolitic crystal such that a mono-dispersed snowball structure results. In other words, the molecular sieve includes an agglomeration of crystals of a molecular sieve that is isomorphously substituted with a tetravelent metal. As is apparent to one of ordinary skill in the art, the particles of the molecular sieve comprising an isomorphously substituted zeolitic framework material are significantly larger than molecular sieves having the CHA structure prepared according to conventional methods known in the art. Such conventionally prepared molecular sieves are known to have a particle size less than about 0.5 μm.

The monodispersed snowball structure of one or more embodiments may be more readily understood by the schematic in FIG. 1. Referring to FIG. 1, an exemplary embodiment of a catalyst material is shown. The catalyst material comprises a spherical particle 10 including an agglomeration of molecular sieve crystals 20. The spherical particle 10 has a particle size, $S_p$, of about 0.5 to about 5 microns, including about 1.2 to about 3.5 microns. The individual crystals 20 of a molecular sieve have a crystal size $S_c$ in the range of about 1 to about 250 nanometers, including about 100 to 250 nm, or 100 to 200 nm. In one or more embodiments, the individual crystals 20 of molecular sieve form a microagglomerate 30, which then forms the macroagglomerated snowball structure 10. The microagglomerate 30 has a size $S_m$ in the range of less than 1.0 micron and greater than 0 microns.

As is apparent to one of ordinary skill in the art, the spherical particles of the crystals of molecular sieve are significantly different in structure than molecular sieves having the CHA structure which do not have an agglomerated snowball structure.

The catalyst material according to embodiments of the invention may be provided in the form of a powder or a sprayed material from separation techniques including decantation, filtration, centrifugation, or spraying.

In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which is deposited upon a suitable refractory carrier, for example, a flow through honeycomb substrate carrier or a wall flow honeycomb substrate carrier.

The catalyst material according to embodiments of the invention may also be provided in the form of extrudates, pellets, tablets, or particles of any other suitable shape, for use as a packed bed of particulate catalyst, or as shaped pieces such as plates, saddles, tubes, or the like.

SCR Catalyst Composite:

Governmental regulations mandate the use of $NO_x$ reduction technologies for light and heavy-duty vehicles. Selective catalytic reduction (SCR) of $NO_x$ using ammonia is an effective and dominant emission control technology for $NO_x$ control. In an exemplary embodiment, provided is an SCR catalyst composite having enhanced ammonia storage capacity at temperatures of 400° C. and above, and the capability to promote ammonia storage over water. While the catalyst material of one or more embodiments can be used in any lean burn engine, including diesel engines, lean burn gasoline direct injection engines, and compressed natural gas engines, in specific embodiments, the catalyst materials are to be used in lean burn gasoline direct injection (GDI) engines.

Embodiments of the invention are directed to a catalyst composite comprising a SCR catalyst material and an ammonia storage material comprising a transition metal having an oxidation state of IV. The SCR catalyst composite is effective to store ammonia at 400° C. and above with a minimum $NH_3$ storage of 0.1 g/L at 400° C. In one or more embodiments, the SCR catalyst material promotes the reaction of ammonia with nitrogen oxides to form nitrogen and $H_2O$ selectively over a temperature range of 150° C. to 600° C., and the ammonia storage material is effective to store ammonia at 400° C. and above with a minimum $NH_3$ storage of 0.1 g/L at 400° C. It was surprisingly found that the catalyst composites are particularly suitable in exhaust gas purification catalyst components, in particular as SCR catalysts.

According to one or more embodiments, a SCR catalyst composite comprises a SCR catalyst material and an ammonia storage material. In one or more embodiments, the SCR catalyst material comprises one or more of a molecular sieve, a mixed oxide, and an activated refractory metal oxide support.

In one or more embodiments, the SCR catalyst material comprises a molecular sieve. According to one or more embodiments, the ammonia storage material comprises transition metal having an oxidation state of IV. Without intending to be bound by theory, it is thought that the presence of an element with a formal oxidation state of IV helps to increase ammonia storage at high temperature. In one or more embodiments, the transition metal having an oxidation state of IV can either be in oxide form, or intrinsically embedded in the SCR catalyst material. As used herein, the term "transition metal having an oxidation state of IV" refers to a metal having a state with four electrons available for covalent chemical bonding in its valence (outermost electron shell). Transition metals having an oxidation state of IV include germanium (Ge), cerium (Ce), and those transition metals located in Group 4 of the periodic table, titanium (Ti), zirconium (Zr), and hafnium (Hf). In one or more embodiments, the transition metal having an oxidation state of IV is selected from Ti, Ce, Zr, Hf, Ge, and combinations thereof. In specific embodiments, the transition metal having an oxidation state of IV comprises Ti.

One or more embodiments of the present invention are directed to an SCR catalyst composite comprising an SCR catalyst material and an ammonia storage material comprising a transition metal having an oxidation state of IV, wherein the SCR catalyst material and the ammonia storage material are in a layered arrangement or relationship. In one or more embodiments, the ammonia storage material can be in any flexible form, e.g. layered or uniformly mixed with the SCR catalyst material, and intrinsically implemented within the same SCR catalyst material. According to one or more embodiments, the ammonia storage material is dispersed as a layer on top of the SCR catalyst material. According to one or more embodiments, the SCR catalyst material is washcoated onto a substrate, and then the ammonia storage material is washcoated in a layer overlying the SCR catalyst material.

In other embodiments, the SCR catalyst material and the ammonia storage material are arranged in a zoned configuration. In one or more embodiments, the SCR catalyst material and the ammonia storage material are arranged in a laterally zoned configuration, with the ammonia storage material upstream from the SCR catalyst material. As used herein, the term "laterally zoned" refers to the location of the SCR catalyst material and the ammonia storage material relative to one another. Lateral means side-by-side such that the SCR catalyst material and the ammonia storage material are located one beside the other with the ammonia storage material upstream of the SCR catalyst material. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. According to one or more embodiments, the laterally zoned ammonia storage material and SCR catalyst material can be arranged on the same or a common substrate or on different substrates separated from each other.

In still further embodiments, the SCR catalyst material is ion-exchanged with the ammonia storage material.

In one or more embodiments, when in a layered or zoned arrangement, the transition metal having an oxidation state of IV can be present in an oxide form, can be ion-exchanged, or can be isomorphously substituted at a zeolitic framework position. For example, in specific embodiments, the transition metal having an oxidation state of IV comprises titanium. In such embodiments where the transition metal having an oxidation state of IV is present in the oxide form, the ammonia storage material comprising a transition metal having an oxidation state of IV is dispersed over a support material.

Figure 2:
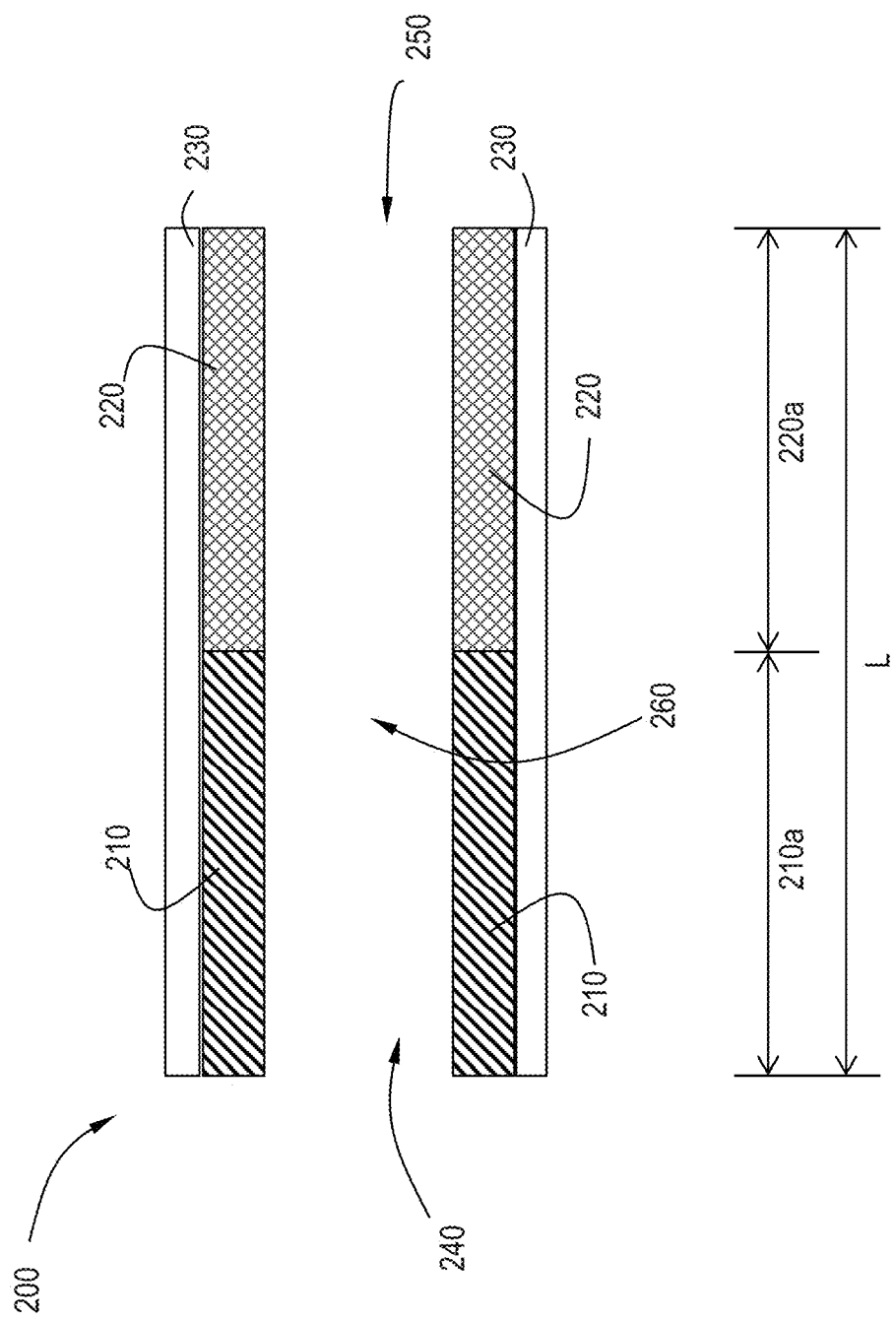
FIG. 2 shows a partial cross-sectional view of an SCR catalyst composite according to one or more embodiments.

Referring to FIG. 2, an exemplary embodiment of a laterally zoned system is shown. The SCR catalyst composite 200 is shown in a laterally zoned arrangement where the ammonia storage material 210 is located upstream of the SCR catalyst material 220 on a common substrate 230. The substrate 230 has an inlet end 240 and an outlet end 250 defining an axial length L. In one or more embodiments, the substrate 230 generally comprises a plurality of channels 260 of a honeycomb substrate, of which only one channel is shown in cross-section for clarity. The ammonia storage material 210 extends from the inlet end 240 of the substrate 230 through less than the entire axial length L of the substrate 230. The length of the ammonia storage material 210 is denoted as first zone 210a in FIG. 2. The ammonia storage material 210 comprises a transition metal having an oxidation state of IV. The SCR catalyst material 220 extends from the outlet end 250 of the substrate 230 through less than the entire axial length L of the substrate 230. The length of the SCR catalyst material 220 is denoted as the second zone 220a in FIG. 2. The SCR catalyst material 220 promotes the reaction of ammonia with nitrogen oxides to form nitrogen and $H_2O$ selectively over a temperature range of 150° C. to 600° C., and the ammonia storage material 210 is effective to store ammonia at 400° C. and above with a minimum $NH_3$ storage of 0.00001 g/L.

It will be appreciated that the length of the first zone 210a and the second zone 220a can be varied. In one or more embodiments, the first zone 210a and second zone 220a can be equal in length. In other embodiments, the first zone can be 20%, 25%, 35% or 40%, 60%, 65%, 75% or 80% of the length L of the substrate, with the second zone respectively covering the remainder of the length L of the substrate.

Figure 3:
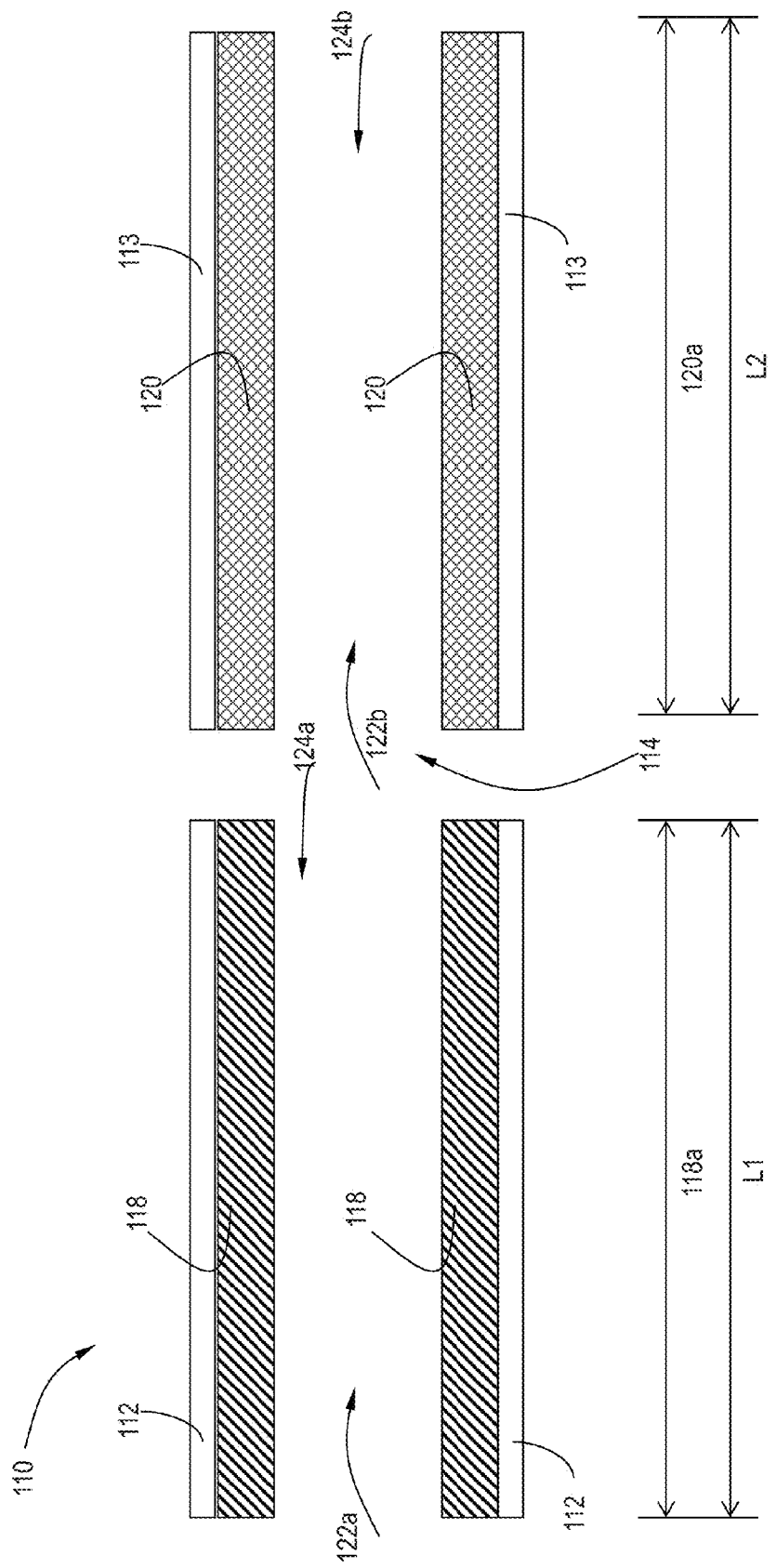
FIG. 3 shows a partial cross-sectional view of an SCR catalyst composite according to one or more embodiments.

Referring to FIG. 3, another embodiment of a laterally zoned SCR catalyst composite 110 is shown. The SCR catalyst composite 110 shown is a laterally zoned arrangement where the ammonia storage material 118 is located upstream of the SCR catalyst material 120 on separate substrates 112 and 113. The ammonia storage material 118 is disposed on a substrate 112, and the SCR catalyst material is disposed on a separate substrate 113. The substrates 112 and 113 can be comprised of the same material or a different material. The substrate 112 has an inlet end 122a and an outlet end 124a defining an axial length L1. The substrate 113 has an inlet end 122b and an outlet end 124b defining an axial length L2. In one or more embodiments, the substrates 112 and 113 generally comprise a plurality of channels 114 of a honeycomb substrate, of which only one channel is shown in cross-section for clarity. The ammonia storage material 118 extends from the inlet end 122a of the substrate 112 through the entire axial length L1 of the substrate 112 to the outlet end 124a. The length of the ammonia storage material 118 is denoted as first zone 118a in FIG. 3. The ammonia storage material 118 comprises a transition metal having an oxidation state of IV. The SCR catalyst material 120 extends from the outlet end 124b of the substrate 113 through the entire axial length L2 of the substrate 113 to the inlet end 122b. The SCR catalyst material 120 defines a second zone 120a. The length of the SCR catalyst material is denoted as the second zone 20b in FIG. 3. The SCR catalyst material 120 promotes the reaction of ammonia with nitrogen oxides to form nitrogen and $H_2O$ selectively over a temperature range of 150° C. to 600° C., and the ammonia storage material 118 is effective to store ammonia at 400° C. and above with a minimum $NH_3$ storage of 0.00001 g/L. The length of the zones 118a and 120a can be varied as described with respect to FIG. 2.

Figure 4A:
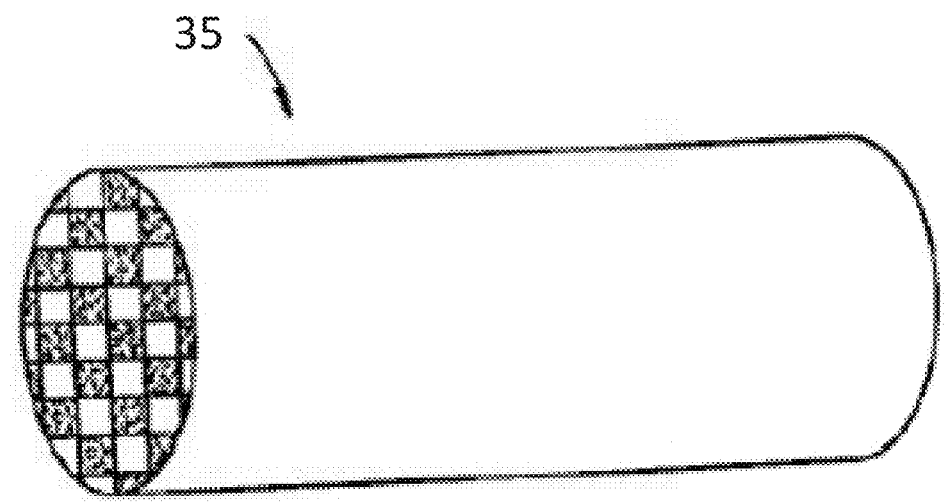
FIG. 4A shows a perspective view of a wall flow filter substrate.
Figure 4B:
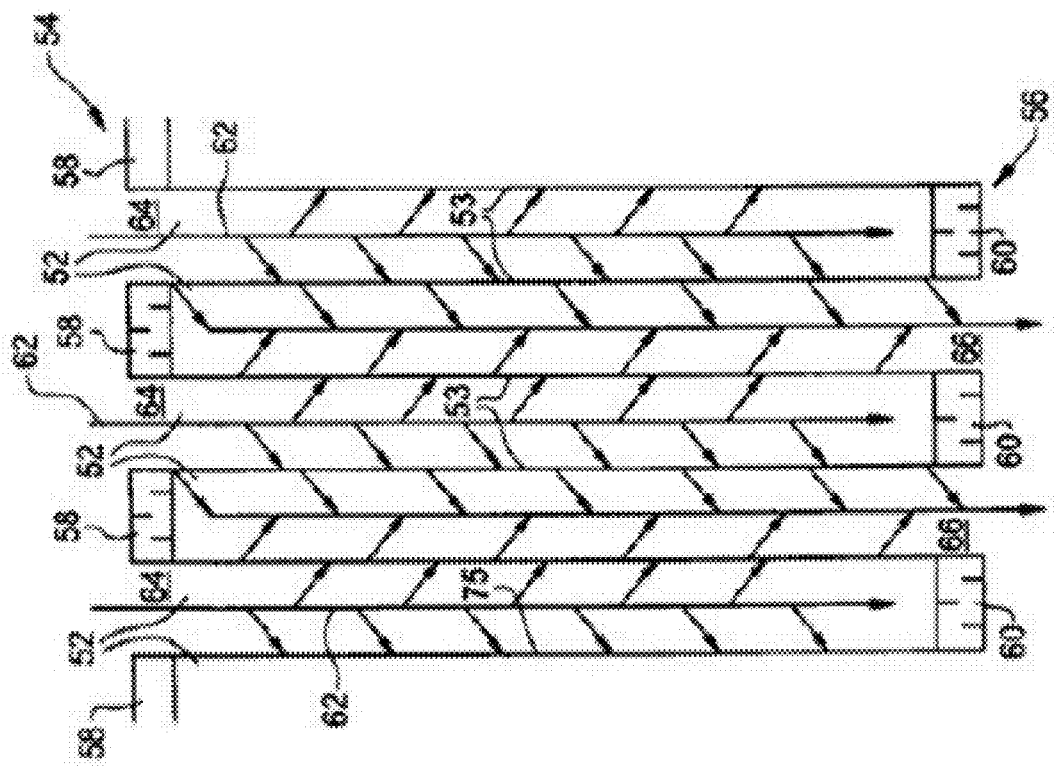
FIG. 4B shows a cutaway view of a section of a wall flow filter substrate.

In one or more embodiments, the SCR catalyst composite, comprising the ammonia storage material and the SCR catalyst material, is coated on a flow through or wall-flow filter. FIGS. 4A and 4B illustrate a wall flow filter substrate 35 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

In one or more embodiments, wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. In other embodiments, wall flow substrates are formed of ceramic fiber composite materials. In specific embodiments, wall flow substrates are formed from cordierite and silicon carbide. Such materials are able to withstand the environment, particularly high temperatures, encountered in treating the exhaust streams.

In one or more embodiments, wall flow substrates include thin porous walled honeycombs monoliths through which the fluid stream passes without causing too great an increase in back pressure or pressure across the article. Normally, the presence of a clean wall flow article will create a back pressure of 1 inch water column to 10 psig. Ceramic wall flow substrates used in the system are formed of a material having a porosity of at least 50% (e.g., from 50 to 75%) having a mean pore size of at least 5 microns (e.g., from 5 to 30 microns). In one or more embodiments, the substrates have a porosity of at least 55% and have a mean pore size of at least 10 microns. When substrates with these porosities and these mean pore sizes are coated with the techniques described below, adequate levels of catalyst compositions can be loaded onto the substrates to achieve excellent $NO_x$ conversion efficiency. These substrates are still able to retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are formed with lower wall porosities, e.g., from about 35% to 50%, than the wall flow filters utilized in the invention. In general, the pore size distribution of commercial wall flow filters is typically very broad with a mean pore size smaller than 17 microns.

The porous wall flow filter used in one or more embodiments is catalyzed in that the wall of said element has thereon or contained therein one or more SCR catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with the SCR catalyst composite of one or more embodiments, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

According to one or more embodiments, the ammonia storage material of the SCR catalyst composite is dispersed within the SCR catalyst material. Thus, according to embodiments of the invention, the SCR catalyst material comprises a molecular sieve having a framework of silicon (Si) and aluminum (Al) ions, and, optionally phosphorus (P) ions, wherein a fraction of the silicon atoms are isomorphously substituted with the ammonia storage material which comprises a transition metal having an oxidation state of IV.

In one or more embodiments, an ammonia oxidation (AMOx) catalyst may be provided downstream of the SCR catalyst composite to remove any slipped ammonia from the exhaust gas treatment system. In specific embodiments, the AMOx catalyst may comprise a platinum group metal such as platinum, palladium, rhodium, or combinations thereof.

AMOx and/or SCR catalyst material(s) can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

In one or more embodiments, a fraction of the silicon atoms are isomorphously substituted with a transition metal having an oxidation state of IV. In other words, a fraction of the silicon atoms in the zeolitic framework material are being replaced with a transition metal having an oxidation state of IV. Such isomorphous substitution does not significantly alter the crystal structure of the zeolitic framework material.

Typically, $NH_3$ storage over zeolite SCR catalysts needs to be suppressed in order to gain faster $NO_x$ conversion response for the highly dynamic engine operations. Without intending to be bound by theory, it is thought that with the SCR catalysts of the prior art, it is impossible to achieve the required high temperature $NH_3$ storage by relying on the weak $NH_3$ physisorption in the porosity of zeolites, or the Brønsted acidity of unused exchange sites due to the presence of relatively high amounts of competing water vapor.

Therefore, it is necessary to implement a secondary functional site, i.e., utilization of Lewis acidity, which is capable of performing high temperature $NH_3$ storage and which is capable of differentiating $NH_3$ and $H_2O$ for storage. It is thought that because $NH_3$, by nature, is nucleophilic (or, more generally, basic), Lewis acidity can provide an additional route for $NH_3$ storage. Accordingly, transition metals with different oxidation states can provide tunable strength of Lewis acidity. In general, the higher the oxidation state of the transition metal, the stronger Lewis acidity is expected. Thus, it is believed that a transition metal having an oxidation state of IV will produce catalyst materials where $NH_3$ can be stored at higher temperatures.

In one or more embodiments, the SCR catalyst material comprises a molecular sieve which comprises $SiO_4/AlO_4$ tetrahedra. In one or more embodiments, the SCR catalyst material is isomorphously substituted with the ammonia storage material. In such embodiments, the SCR catalyst material comprises $MO_4/SiO_4/AlO_4$ tetrahedra (where M is a transition metal having an oxidation state of IV) and is linked by common oxygen atoms to form a three-dimensional network. The isomorphously substituted transition metal having an oxidation state of IV is embedded into the molecular sieve as a tetrahedral atom ($MO_4$). The isomorphously substituted tetrahedron units together with the silicon and aluminum tetrahedron units then form the framework of the molecular sieve. In specific embodiments, the transition metal having an oxidation state of IV comprises titanium, and the SCR catalyst material then includes $TiO_4/SiO_4/AlO_4$ tetrahedra.

In other embodiments, the SCR catalyst material comprises a molecular sieve which comprises $SiO_4/AlO_4/PO_4$ tetrahedra. In one or more embodiments, the SCR catalyst material is isomorphously substituted with the ammonia storage material. In such embodiments, the SCR catalyst material comprises $MO_4/SiO_4/AlO_4/PO_4$ tetrahedra (where M is a transition metal having an oxidation state of IV) and is linked by common oxygen atoms to form a three-dimensional network. The isomorphously substituted transition metal having an oxidation state of IV is embedded into the molecular sieve as a tetrahedral atom ($MO_4$). The isomorphously substituted tetrahedron units together with the silicon, aluminum, and phosphorus tetrahedron units then form the framework of the molecular sieve. In specific embodiments, the transition metal having an oxidation state of IV comprises titanium, and the SCR catalyst material then includes $TiO_4/SiO_4/AlO_4/PO_4$ tetrahedra.

The isomorphously substituted molecular sieve of one or more embodiments is differentiated mainly according to the geometry of the voids which are formed by the rigid network of the $MO_4/(SiO_4)/AlO_4$ tetrahedra (where M is a transition metal having an oxidation state of IV).

In one or more embodiments, the molecular sieve of the SCR catalyst material has a structure-type selected from any of those previously discussed. In one or more specific embodiments, the molecular sieve has a structure type selected from MFI, BEA, AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular material has a structure type selected from the group consisting of MFI, BEA, CHA, AEI, AFX, ERI, KFI, LEV, and combinations thereof. In very specific embodiments, the molecular sieve has a structure type selected from CHA, AEI, and AFX. In very specific embodiments, the molecular sieve comprises SSZ-13, SSZ-39, or SAPO-34. In another very specific embodiment, the molecular sieve is an aluminosilicate zeolite type and has the AEI structure type, for example, SSZ-39. According to one or more embodiments, it will be appreciated that by defining the molecular sieves by their structure type, it is intended to include the structure type and any and all isotypic framework materials such as SAPO, AlPO and MeAPO materials having the same structure type.

The ratio of silica to alumina of a molecular sieve can vary over a wide range. In one or more embodiments, the molecular sieve has a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

The ratio of transition metal having an oxidation state of IV to alumina can vary over a very wide range. In one or more embodiments, the transition metal having an oxidation state of IV to alumina ratio is in the range of 0.001 to 10000, including 0.001:10000, 0.001 to 1000, 0.01 to 10. In other embodiments, the transition metal having an oxidation state of IV to alumina ratio is in the range of 0.01 to 10, including 0.01 to 10, 0.01: to 5, 0.01 to 2, and 0.01 to 1. In specific embodiments, the transition metal having an oxidation state of IV to alumina ratio is in the range of 0.01 to 2.

In specific embodiments, the transition metal having an oxidation state of IV comprises titanium, and the titania to alumina ratio is in the range of 0.001 to 10000, including 0.001:10000, 0.001 to 1000, 0.01 to 10. In other embodiments, the titania to alumina ratio is in the range of 0.01 to 10, including 0.01 to 10, 0.01: to 5, 0.01 to 2, and 0.01 to 1. In specific embodiments, the titania to alumina ratio is in the range of 0.01 to 2. In very specific embodiments, the titania to alumina ratio is about 1.

The ratio of silica to transition metal having an oxidation state of IV can vary over a wide range. It is noted that this ratio is an atomic ratio, not a molar ratio. In one or more embodiments, the silica to transition metal having an oxidation state of IV ratio is in the range of 1 to 100, including 1 to 50, 1 to 30, 1 to 25, 1 to 20, 5 to 20, and 10 to 20. In specific embodiments, the silica to transition metal having an oxidation state of IV ratio is about 15. In one or more embodiments, the transition metal having an oxidation state of IV comprises titanium, and the silica to titania ratio is in the range of 1 to 100, including 1 to 50, 1 to 30, 1 to 25, 1 to 20, 5 to 20, and 10 to 20. In specific embodiments, the silica to titania ratio is about 15.

In order to promote the SCR of oxides of nitrogen, in one or more embodiments, a suitable metal is exchanged into the SCR catalyst material. According to one or more embodiments, the SCR catalyst material is promoted with a metal selected from Cu, Fe, Co, Ni, La, Ce, Mn, V, Ag, and combinations thereof. In specific embodiments, the SCR catalyst material is promoted with Cu, Fe, and combinations thereof.

The promoter metal content of the SCR catalyst material, calculated as the oxide, is, in one or more embodiments, at least about 0.1 wt %, reported on a volatile-free basis. In specific embodiments, the promoter metal comprises Cu, and the Cu content, calculated as CuO is in the range of up to about 10 wt %, including 9, 8, 7, 6, 5, 4, 3, 2, and 1 wt %, in each case based on the total weight of the calcined SCR catalyst material reported on a volatile free basis. In specific embodiments, the Cu content, calculated as CuO, is in the range of about 2 to about 5 wt %.

Without intending to be bound by theory, it is thought that when the SCR catalyst material is isomorphously substituted with the ammonia storage material comprising a transition metal having an oxidation state of IV, the transition metal having an oxidation state of IV is embedded into the molecular sieve framework as a tetrahedral atom, allowing for close coupling to the active promoter metal center both structurally and electronically. In one or more embodiments, the promoter metal can be ion exchanged into the SCR catalyst material. In specific embodiments, copper is ion exchanged into the SCR catalyst material. The metal can be exchanged after the preparation or manufacture of the SCR catalyst material.

According to one or more embodiments, the SCR catalyst material comprises a mixed oxide. As used herein, the term "mixed oxide" refers to an oxide that contains cations of more than one chemical element or cations of a single element in several states of oxidation. In one or more embodiments, the mixed oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina, Mn/titania (e.g. $MnO_x/TiO_2$) (e.g. $MnO_x/Al_2O_3$), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. In specific embodiments, the mixed oxide comprises vanadia/titania. The vanadia/titania oxide can be activated or stabilized with tungsten (e.g. $WO_3$) to provide $V_2O_5/TiO_2/WO_3$. In one or more embodiments, the SCR catalyst material comprises titania on to which vanadia has been dispersed. The vanadia can be dispersed at concentrations ranging from 1 to 10 wt %, including 1, 2, 3, 4, 5, 6, 7, 8, 9, 10 wt %. In specific embodiments the vanadia is activated or stabilized by tungsten ($WO_3$). The tungsten can be dispersed at concentrations ranging from 0.5 to 10 wt %, including 1, 2, 3. 4, 5, 6, 7, 8, 9, and 10 wt %. All percentages are on an oxide basis.

According to one or more embodiments, the SCR catalyst material comprises a refractory metal oxide support material. As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BEI surface area than activated alumina, that disadvantage tends to be offset by a greater durability or performance enhancement of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

One or more embodiments of the present invention include a high surface area refractory metal oxide support comprising an activated compound selected from the group consisting of alumina, ceria, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, alumina-chromia, alumina-ceria, zirconia-silica, titania-silica, or zirconia-titania, and combinations thereof. In one or more embodiments, the activated refractory metal oxide support is exchanged with a metal selected from the group consisting of Cu, Fe, Co, Ni, La, Ce, Mn, V, Ag, and combinations thereof.

SCR Activity:

In one or more embodiments, the selective catalytic reduction material comprising a spherical particle including an agglomeration of crystals of a molecular sieve exhibits an aged $NO_x$ conversion at 200° C. of at least 50% measured at a gas hourly space velocity of 80000 $h^{-1}$. In specific embodiments the catalyst exhibits an aged $NO_x$ conversion at 450° C. of at least 70% measured at a gas hourly space velocity of 80000 $h^{-1}$. More specifically the aged NO conversion at 200° C. is at least 55% and at 450° C. at least 75%, even more specifically the aged $NO_x$ conversion at 200° C. is at least 60% and at 450° C. at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The cores were hydrothermally aged in a tube furnace in a gas flow containing 10% $H_2O$, 10% $O_2$, balance $N_2$ at a space velocity of 4,000 $h^{-1}$ for 5 h at 750° C.

The SCR activity measurement has been demonstrated in the literature, see, for example PCT Application Publication No. WO 2008/106519.

Furthermore, according to one or more embodiments, the catalyst material is effective to lower $N_2O$ make.

Formation of $NO^+$ and Ammonia Storage:

Additionally, according to one or more embodiments, particularly when the molecular sieve comprises an isomorphously substituted zeolitic framework material of silicon and aluminum atoms, wherein a fraction of the silicon atoms are isomorphously substituted with a tetravalent metal, the material is effective to promote the formation of $NO^+$. Without intending to be bound by theory, it is thought that the d6r unit of the zeolitic framework material is an important factor in facilitating $NO^+$ formation due to the fact that the d6r unit promotes short-range promoter metal (e.g. Cu)

migration/hopping between the two six-member ring mirror planes to generate suitable vacant positions for NO$^+$, which requires a stabilizing coordination environment also provided by the d6r unit.

Furthermore, according to one or more embodiments, particularly when the SCR catalyst composite comprises a SCR catalyst material and an ammonia storage material comprising a transition metal having an oxidation state of IV, the SCR catalyst material promotes the reaction of ammonia with nitrogen oxides to form nitrogen and H$_2$O selectively over a temperature range of 150° C. to 600° C., and the ammonia storage material is effective to store ammonia at temperatures of about 400° C. and above with a minimum ammonia storage of 0.00001 g/L. In one or more embodiments, the oxygen content of the exhaust gas stream is from 0 to 30% and the water content is from 1 to 20%. The SCR catalyst composite according to one or more embodiments adsorbs NH$_3$ even in the presence of H$_2$O. The SCR catalyst composites of one or more embodiments show more pronounced high temperature ammonia storage capacity than reference SCR catalyst materials and catalyst composites.

Water, also carrying electron lone pairs as a nucleophile, is the biggest competitor towards ammonia storage with Brønsted acid sites. In order to be efficiently utilized by the NO$_x$ generated in the lean cycle of lean GDI engines, it is important to increase the chemically adsorbed NH$_3$ amount, rather than the physically adsorbed NH$_3$ amount. Without intending to be bound by theory, it is thought that the Lewis acidity of a transition metal having an oxidation state of IV increases the capability of the SCR catalyst composite to chemically adsorb ammonia. Thus, the SCR catalyst composites according to one or more embodiments have improved ammonia storage capability at temperatures of about 400° C. and above.

The Substrate:

In one or more embodiments, the catalyst materials can be applied to a substrate as a washcoat. As used herein, the term "substrate" refers to the monolithic material onto which the catalyst is placed, typically in the form of a washcoat. A washcoat is formed by preparing a slurry containing a specified solids content (e.g., 30-90% by weight) of catalyst in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

Preparation of Catalyst and Catalyst Materials:

Synthesis of Conventional CHA-Type Molecular Sieves

A molecular sieve having the CHA structure may be prepared according to various techniques known in the art, for example U.S. Pat. No. 4,544,538 (Zones) and U.S. Pat. No. 6,709,644 (Zones), which are herein incorporated by reference in their entireties.

Optionally NH$_4$-Exchange to Form NH$_4$-Chabazite:

Optionally, the obtained alkali metal zeolite is NH$_4$-exchanged to form NH$_4$-Chabazite. The NH$_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Synthesis of Snowball Molecular Sieves

A molecular sieve having a snowball-type morphology water can be prepared from adamantyltrimethylammonium hydroxide (ADAOH), aqueous sodium hydroxide, aluminum isopropoxide powder, and colloidal silica.

Synthesis of Isomorphously Substituted Zeolitic Framework Materials

According to one or more embodiments, methods for the synthesis of selective catalytic reduction catalyst materials comprising an isomorphously substituted zeolitic framework material are provided. Particularly, the catalyst material comprises a zeolitic framework material of silicon and aluminum atoms, wherein a fraction of the silicon atoms are isomorphously substituted with a tetravalent metal.

Generally, the sodium form of the isomorphously substituted zeolitic framework material can be prepared from a 0.03Al$_2$O$_3$:SiO$_2$:0.07TiO$_2$:0.06Na$_2$O:0.08ATMAOH: 2.33H$_2$O gel composition through autoclave hydrothermal synthesis. The product is recovered by filtration, and the template is removed by calcination. The final crystalline material can be characterized by x-ray diffraction studies.

The H-form can be prepared by calcination of the ammonia form, which is obtained through double NH$_4$NO$_3$ exchanges with the sodium form. The Ti level is unchanged/stable through the NH$_4$NO$_3$ exchange processes.

The copper promoted isomorphously substituted zeolitic framework can be prepared by ion exchange using the H-form and Cu(OAc)$_2$ to achieve the desired amount of promoter metal.

Synthesis of Isomorphously Substituted Molecular Sieves

According to one or more embodiments, methods for the synthesis of SCR catalyst composites comprising an SCR catalyst material comprising a molecular sieve isomorphously substituted with an ammonia storage material comprising a transition metal having an oxidation state of IV are provided. Particularly, the SCR catalyst composite comprises an SCR catalyst material having a zeolitic framework material of silicon and aluminum atoms, wherein a fraction of the silicon atoms are isomorphously substituted with the transition metal having an oxidation state of IV of the ammonia storage material.

Generally, the sodium form of the isomorphously substituted molecular sieve can be prepared from a $0.03Al_2O_3$:$SiO_2$:$0.07TiO_2$:$0.06Na_2O$:$0.08ATMAOH$:$2.33H_2O$ gel composition through autoclave hydrothermal synthesis. The product is recovered by filtration, and the template is removed by calcination. The final crystalline material can be characterized by x-ray diffraction studies.

The H-form can be prepared by calcination of the ammonia form, which is obtained through double $NH_4NO_3$ exchanges with the sodium form. The Ti level is unchanged/stable through the $NH_4NO_3$ exchange processes.

The copper promoted isomorphously substituted molecular sieve can be prepared by ion exchange using the H-form and $Cu(OAc)_2$ to achieve the desired amount of promoter metal.

Method of Reducing $NO_x$ and Exhaust Gas Treatment System:

In general, the zeolitic materials that are described above can be used as a molecular sieve, adsorbent, catalyst, catalyst support, or binder thereof. In one or more embodiments, the materials are used as a catalyst.

An additional aspect of the invention is directed to a method of catalyzing a chemical reaction wherein the spherical particle including an agglomeration of crystals of a molecular sieve according to embodiments of the invention is employed as catalytically active material.

Another aspect of the invention is directed to a method of catalyzing a chemical reaction wherein the zeolitic framework material that is isomorphously substituted with a tetravalent metal according to embodiments of the invention is employed as catalytically active material.

A further aspect of the invention is directed to a method of catalyzing a chemical reaction wherein the SCR catalyst composite that comprises an SCR catalyst material and an ammonia storage material comprising a transition metal having an oxidation state of IV according to embodiments of the invention is employed as catalytically active material.

Among others, said catalyst materials and catalyst composites may be employed as catalysts for the selective reduction (SCR) of nitrogen oxides ($NO_x$); for the oxidation of $NH_3$, in particular for the oxidation of $NH_3$ slip in diesel systems; for applications in oxidation reactions, in specific embodiments an additional precious metal component (e.g. Pd, Pt) is added to the spherical particle including an agglomeration of crystals of a molecular sieve.

One or more embodiments provide a method of selectively reducing nitrogen oxides ($NO_x$). In one or more embodiments, the method comprises contacting an exhaust gas stream containing $NO_x$ with the catalyst materials or the catalyst composites of one or more embodiments. In particular, the selective reduction of nitrogen oxides wherein the selective catalytic reduction catalyst material comprises a spherical particle including an agglomeration of crystals of a molecular sieve, wherein the spherical particle has a median particle size in the range of about 0.5 to about 5 microns, of embodiments of the invention is employed as catalytically active material is carried out in the presence of ammonia or urea.

While ammonia is the reducing agent of choice for stationary power plants, urea is the reducing agent of choice for mobile SCR systems. Typically, the SCR system is integrated in the exhaust gas treatment system of a vehicle and, also typically, contains the following main components: selective catalytic reduction material comprising a spherical particle including an agglomeration of crystals of a molecular sieve, wherein the spherical particle has a median particle size in the range of about 0.5 to about 5 microns according to embodiments of the invention; a urea storage tank; a urea pump; a urea dosing system; a urea injector/nozzle; and a respective control unit.

In other embodiments, the SCR catalyst composite according to one or more embodiments is employed as an SCR catalyst in an exhaust gas treatment system for lean-burn gasoline direct injection engines. In such cases, the SCR catalyst composite according to one or more embodiments serves as a passive ammonia-SCR catalyst and is able to store ammonia effectively at temperatures of 400° C. and above.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

A further aspect of the invention is directed to an exhaust gas treatment system. In one or more embodiments, the exhaust gas treatment system comprises an exhaust gas stream optionally containing a reductant like ammonia, urea, and/or hydrocarbon, and in specific embodiments, ammonia and/or urea, and a selective catalytic reduction material comprising a spherical particle including an agglomeration of crystals of a molecular sieve, wherein the spherical particle has a median particle size in the range of about 0.5 to about 5 microns. The catalyst material is effective for destroying at least a portion of the ammonia in the exhaust gas stream.

In one or more embodiments, the SCR catalyst material can be disposed on a substrate, for example a soot filter. The soot filter, catalyzed or non-catalyzed, may be upstream or downstream of the SCR catalyst material. In one or more embodiments, the system can further comprise a diesel oxidation catalyst. In specific embodiments, the diesel oxidation catalyst is located upstream of the SCR catalyst material. In other specific embodiments, the diesel oxidation catalyst and the catalyzed soot filter are upstream from the SCR catalyst material.

In specific embodiments, the exhaust is conveyed from the engine to a position downstream in the exhaust system, and in more specific embodiments, containing $NO_x$, where a reductant is added and the exhaust stream with the added reductant is conveyed to the SCR catalyst material.

For example, a catalyzed soot filter, a diesel oxidation catalyst, and a reductant are described in WO 2008/106519, which is herein incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation (AMOx) catalyst may be provided downstream of the SCR catalyst material or catalyst composite of one or more embodiments to remove any slipped ammonia from the system. In specific embodiments, the AMOx catalyst may comprise a platinum group metal such as platinum, palladium, rhodium, or combinations thereof.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOx catalyst comprising a zeolite.

AMOx and/or SCR catalyst composition(s) can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Comparative Example 1—Preparation of Catalyst Compositions and Articles

A CuCHA powder catalyst was prepared by crystallization of chabazite using ADAOH (Trimethyl-1-adamantylammonium hydroxide) containing synthesis gel, separation of the chabazite product, drying and calcination to remove organic template (ADAOH). Water, ADAOH solution, and aqueous sodium hydroxide were added into the makedown tank and mixed for several minutes. An aluminum source was then added in 3-5 minutes. Colloidal silica was then added with stirring in 5 minutes. Mixing was continued for an additional 30 minutes, resulting in a viscous gel of uniform composition. The gel was transferred to the autoclave. The autoclave was heated to 170° C., and crystallization was continued for 18 hours while maintaining agitation. The reactor was cooled to <50° C. and vented to atmospheric pressure prior to unloading. After hydrothermal crystallization, the resultant suspension had a pH of 11.5. The suspension was admixed with deionized water and was filtrated with a porcelain suction filter. The wet product was then heated to a temperature of 120° C. in air for 4 hrs. The dried product was then further calcined in air at 600° C. for 5 hrs to remove the template and ensure a C content less than 0.1 wt. %.

Figure 5:
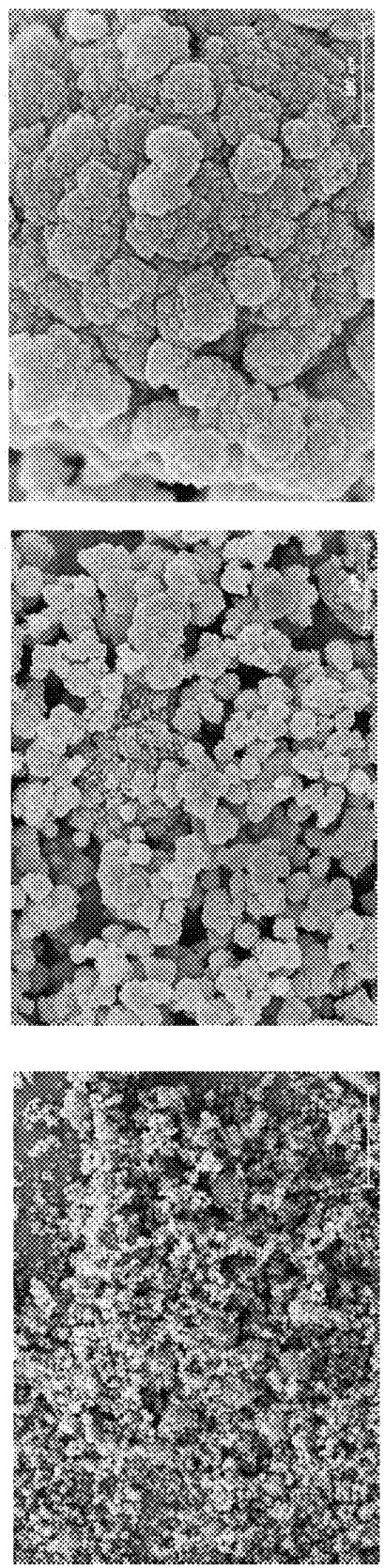
FIG. 5 is a SEM image showing crystal morphology of a catalyst material according to the Examples.

As can been observed in the SEM image of the crystal morphology in FIG. 5, the as-synthesized material (Comparative Example 1) does not have an agglomerated morphology, as identified by SEM analysis (secondary electron imaging) at a scale of 5000×.

The calcined product was then ready to be ion-exchanged with Cu to obtain the metal-containing catalyst.

An ion-exchange reaction between the Na-form CHA and the copper ions was carried out by agitating the slurry at about 60° C. for about 1 hour. The resulting mixture was then filtered to provide a filter cake, and the filter cake was washed with deionized water in three portions until the filtrate was clear and colorless, and the washed sample was dried.

The obtained CuCHA catalyst comprised CuO at a range of about 3 to 3.5% by weight, as determined by ICP analysis. A CuCHA slurry was prepared to 40% target solids. The slurry was milled and a binder of zirconium acetate in dilute acetic acid (containing 30% $ZrO_2$) was added into the slurry with agitation.

The slurry was coated onto 1"D×3"L cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated once to obtain a target washcoat loading of in the range of 2-3 $g/in^3$.

Example 2

The same raw materials as Comparative Example 1 were used to prepare the inventive agglomerated (snowball) CHA material, except additional water was added. The gel make down procedure was also the same as Comparative Example 1. The autoclave was heated to 160° C., and crystallization was continued for 30 hours while maintaining agitation. The reactor was cooled to <50° C. and vented to atmospheric pressure prior to unloading. After hydrothermal crystallization, the resultant suspension had a pH of 12.0. The suspension was admixed with deionized water and was filtrated with a porcelain suction filter. The wet product was then heated to a temperature of 120° C. in air for 4 hrs. The dried product was then further calcined in air at 600° C. for 5 hrs to remove the template and ensure a C content less than 0.1 wt. %.

Figure 6:
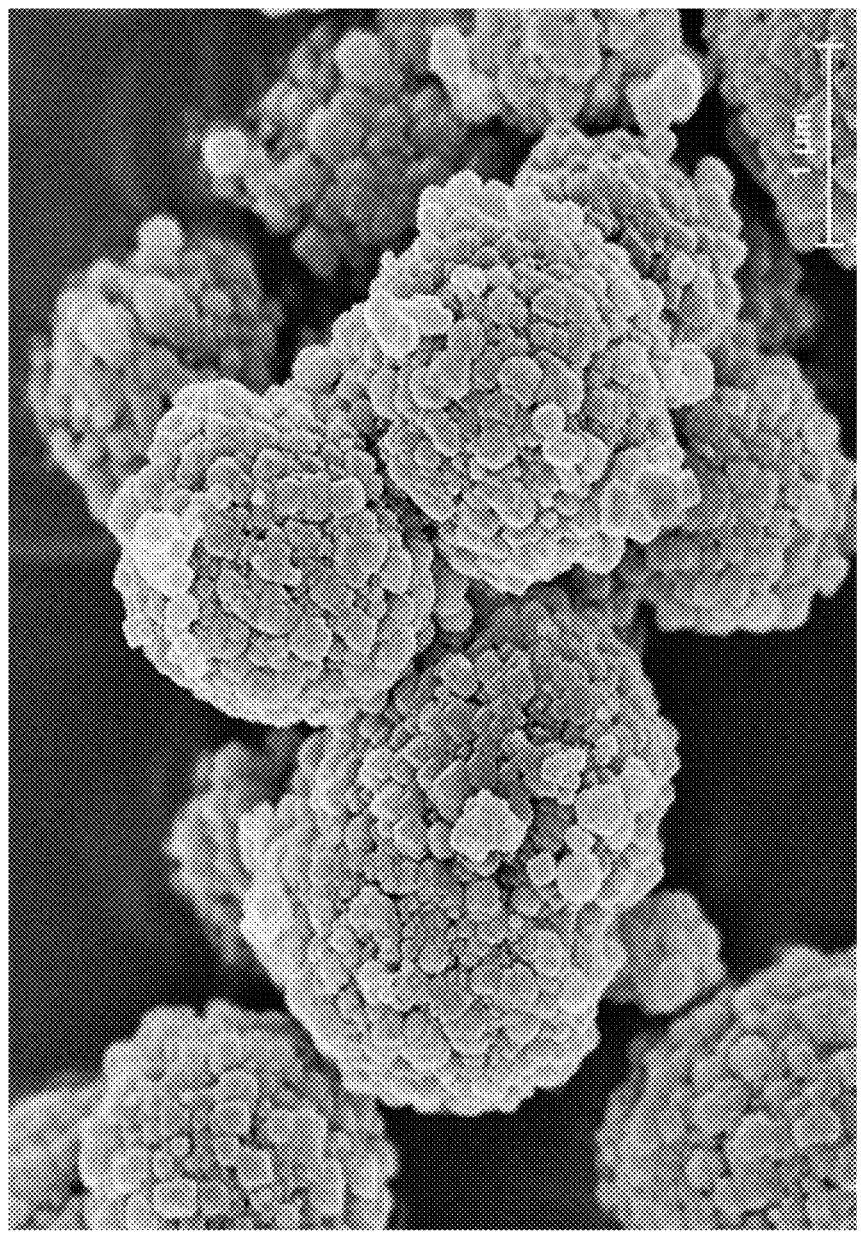
FIG. 6 is a SEM image showing crystal morphology of a catalyst material according to the Comparative Example.

As can been observed in the SEM image of the crystal morphology in FIG. 6, the as-synthesized snowball material (Example 2) has a characteristic secondary structure of spheres with a diameter size of 1-2 μm, as identified by SEM analysis (secondary electron imaging) at a scale of 5000×. The individual crystals of molecular sieve have a crystal size in the range of about 100 to 200 nm.

Example 3—Cu Promotion

An ion-exchange reaction between the Na-form CHA of Example 2 and copper ions was carried out by agitating the slurry at about 60° C. for about 1 hour. The resulting mixture was then filtered to provide a filter cake, and the filter cake was washed with deionized water in three portions until the filtrate was clear and colorless, and the washed sample was dried.

The obtained CuCHA catalysts comprised CuO at a range of about 1.5 to 4% by weight, as determined by ICP analysis. A CuCHA slurry was prepared to 40% target solids. The slurry was milled and a binder of zirconium acetate in dilute acetic acid (containing 30% $ZrO_2$) was added into the slurry with agitation.

Example 4—Preparation of Washcoats

The Example 3 slurries were then coated onto a substrate to a washcoat loading of 2.1 g/in$^3$. The washcoat was dried under air at 130° C. for 5 min. After the final coating, the substrate was calcined at 450° C. for 1 hour.

Example 5—CuO Loading Study

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 hr$^{-1}$ across a 150° C. to 460° C. temperature range.

The samples were hydrothermally aged in the presence of 10% $H_2O$ at 750° C. for 5 hours, followed by measurement of the nitrogen oxides SCR efficiency and selectivity by the same process as outlined above for the SCR evaluation on a fresh catalyst core.

Figure 7:
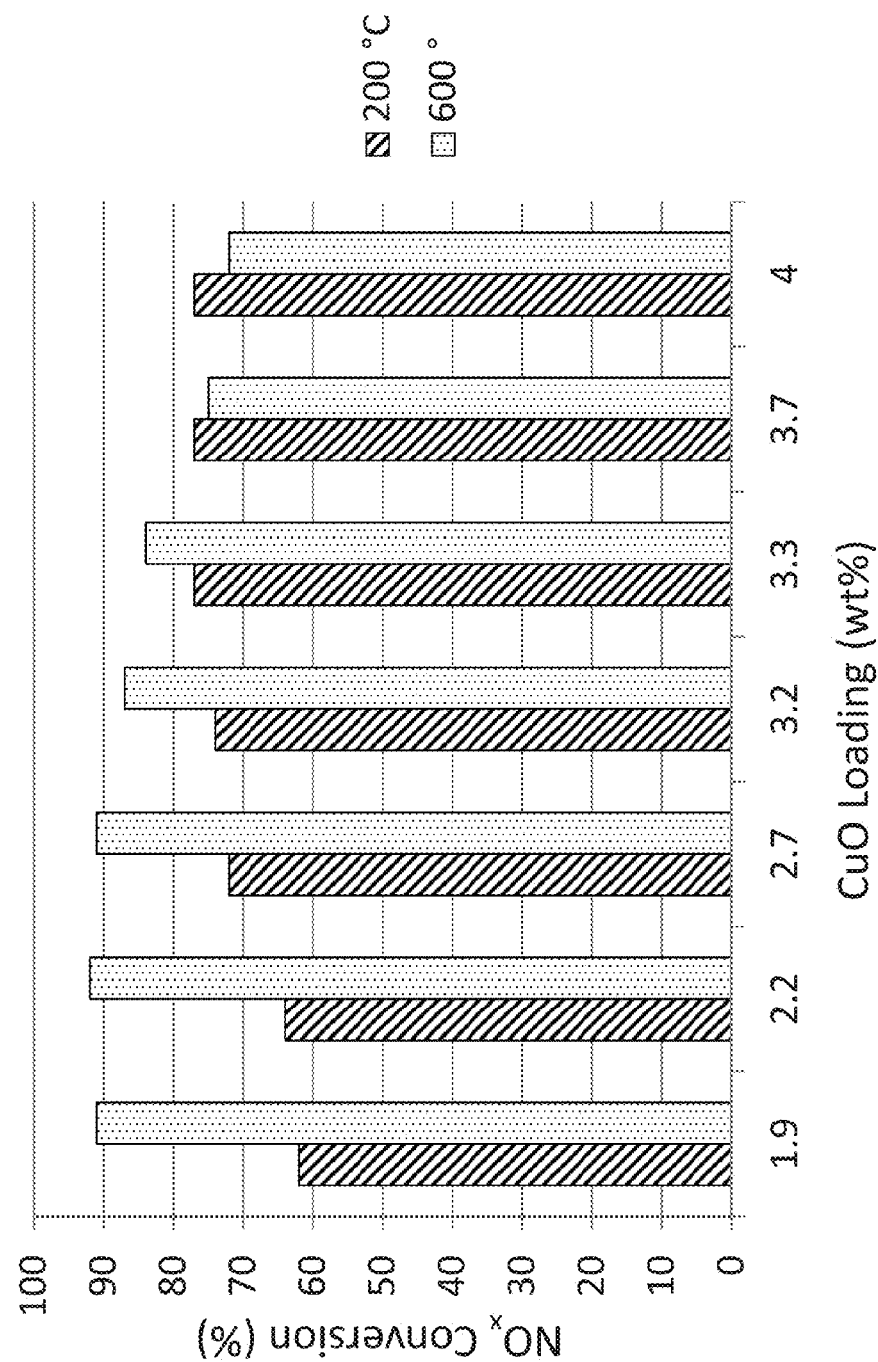
FIG. 7 is a bar graph comparing $NO_x$ conversion for catalysts according to the Examples.

FIG. 7 is a bar graph showing the $NO_x$ conversion (%) versus CuO loading (wt. %).

Figure 8:
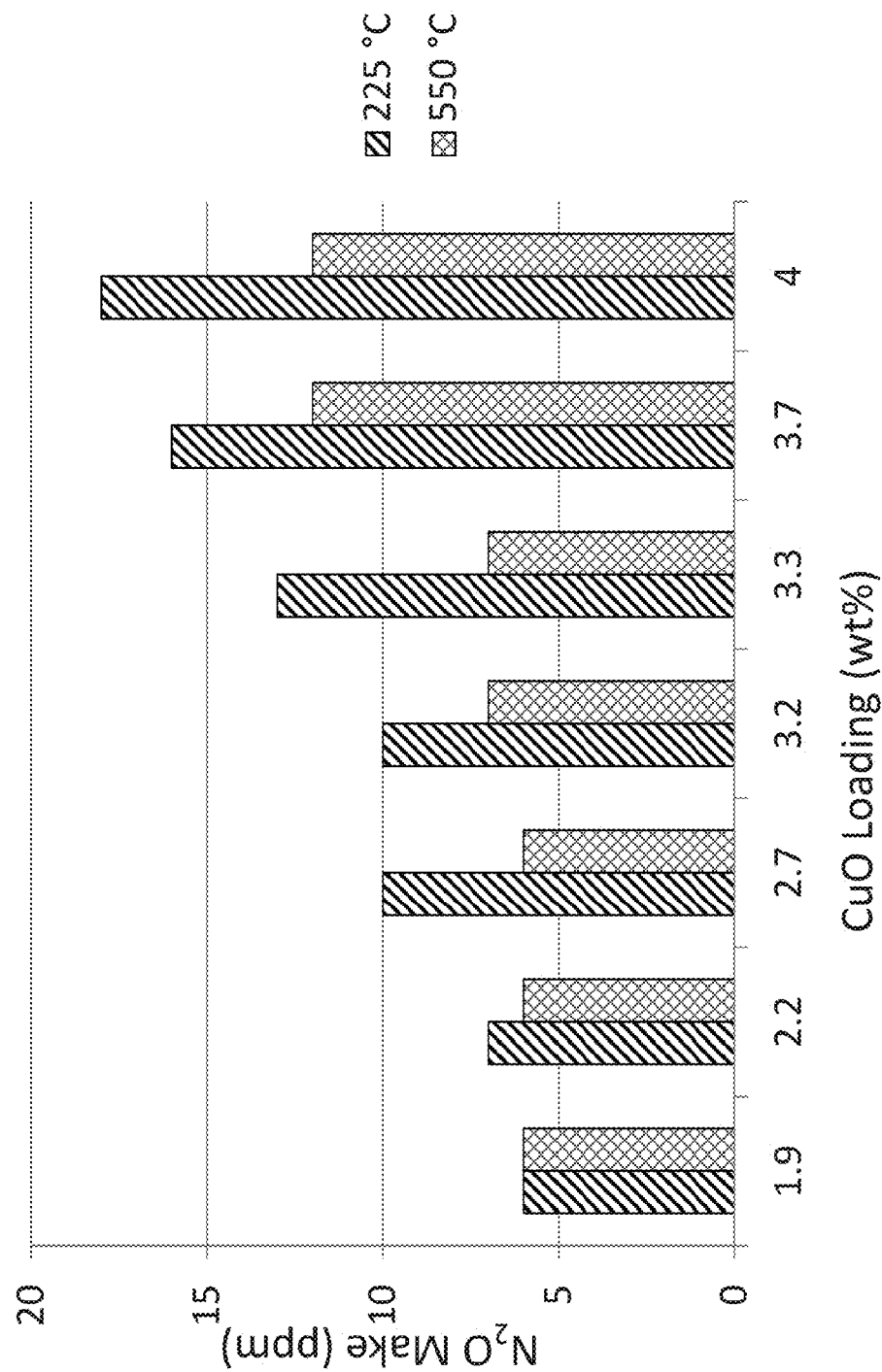
FIG. 8 is a bar graph comparing $N_2O$ make for catalysts according to the Examples.

FIG. 8 is a bar graph showing the $N_2O$ make (ppm) versus CuO loading (wt. %).

Example 6—$NO_x$ Conversion

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 hr$^{-1}$ across a 150° C. to 460° C. temperature range.

The samples were hydrothermally aged in the presence of 10% $H_2O$ at 750° C. for 5 hours, followed by measurement of the nitrogen oxides SCR efficiency and selectivity by the same process as outlined above for the SCR evaluation on a fresh catalyst core.

Figure 9:
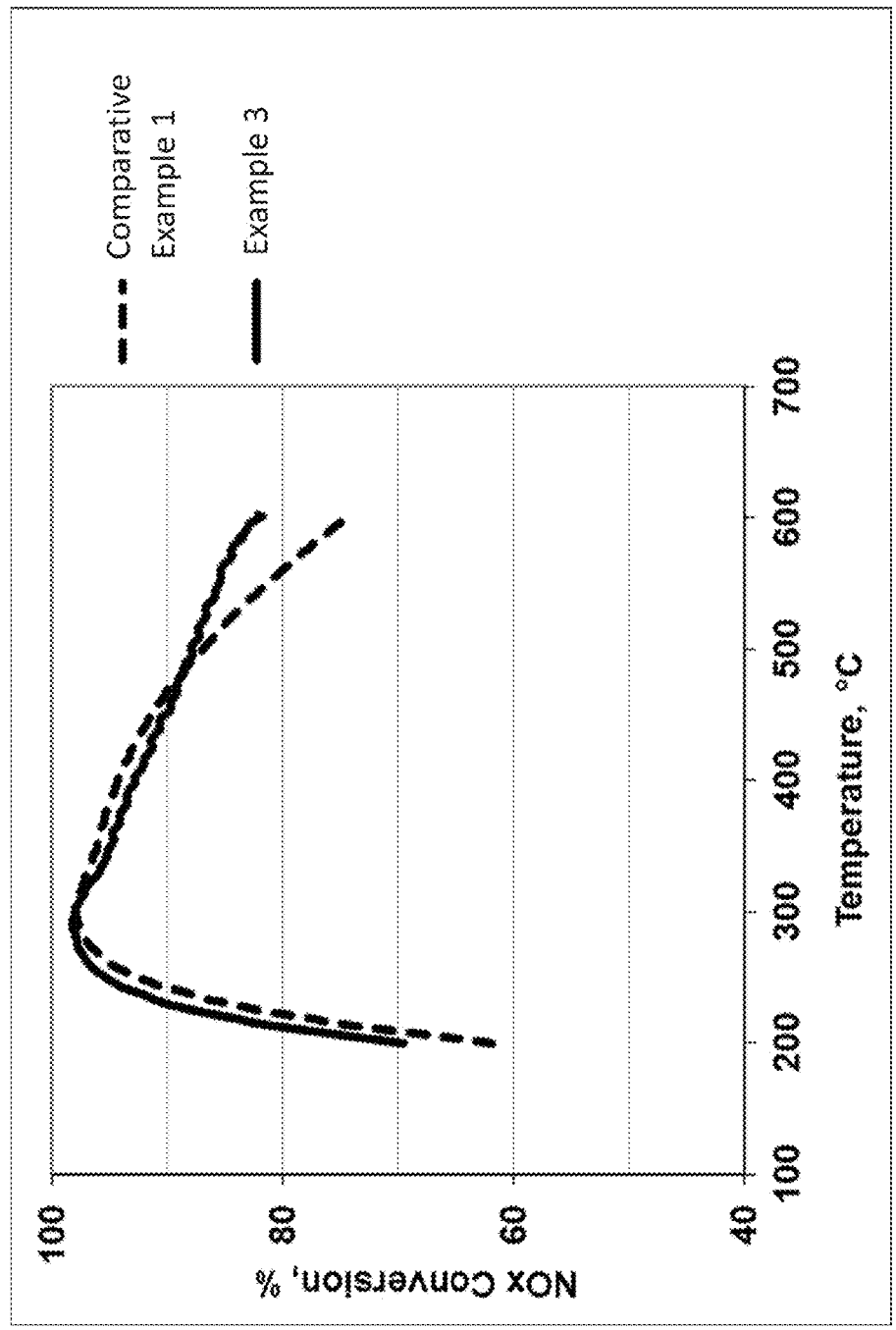
FIG. 9 is a graph comparing $NO_x$ conversion for catalysts according to the Examples.

FIG. 9 is a graph showing the $NO_x$ conversion (%) versus temperature (° C.) for the catalyst of Example 1 (comparative) versus the inventive catalyst of Example 3, having 3.2% CuO.

Figure 10:
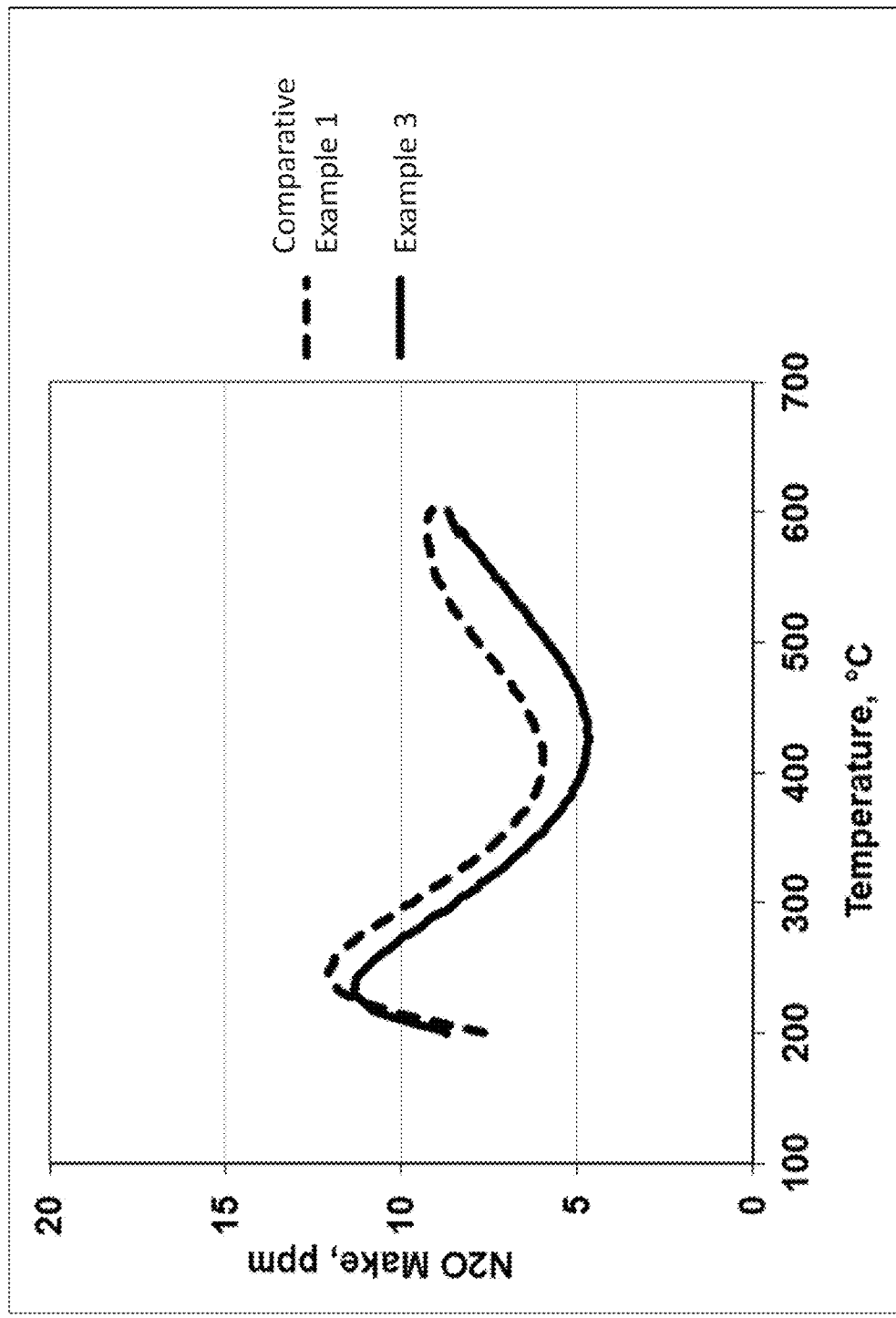
FIG. 10 is a graph comparing $N_2O$ make for catalysts according to the Examples.

FIG. 10 is a graph showing the $N_2O$ make (ppm) versus temperature (° C.) for the catalyst of Example 1 (comparative) versus the inventive catalyst of Example 3, having 3.2% CuO.

Figure 11:
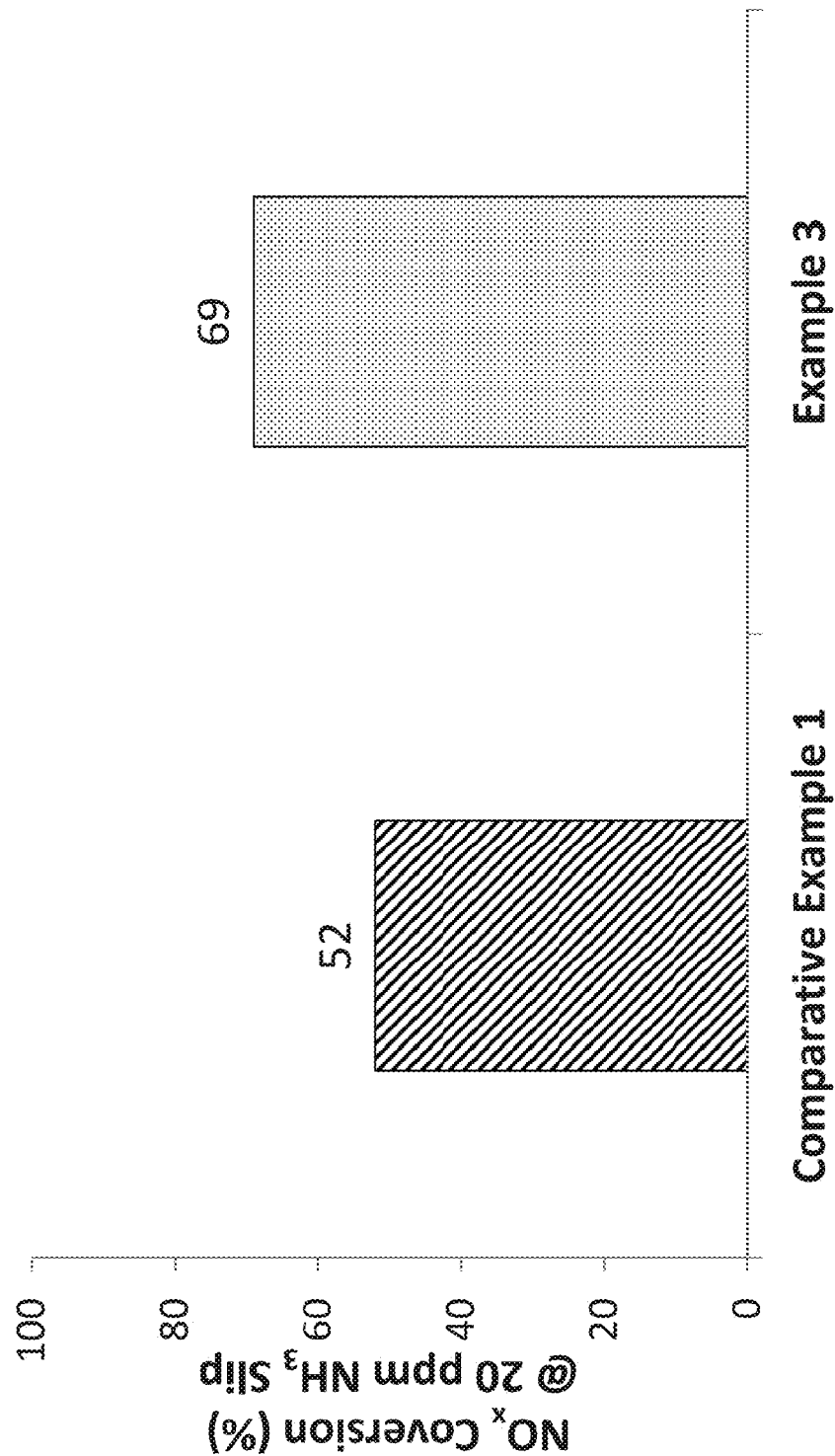
FIG. 11 is a bar graph comparing $NO_x$ conversion at 20 ppm $NH_3$ slip for catalysts according to the Examples.

FIG. 11 is a bar graph showings the $NO_x$ conversion (%) at 20 ppm $NH_3$ slip for the catalyst of Example 1 (comparative) versus the inventive catalyst of Example 3, having 3.2% CuO. The catalyst of Example 3 shows significantly higher $NO_x$ conversion (about 15% greater) at 20 ppm $NH_3$ slip, which is an indication of improved transient performance during engine testing conditions.

As illustrated in FIGS. 9-11, the snowball morphology results in a SCR catalyst material with improved $NO_x$ conversion efficiency and lower $N_2O$ make versus a SCR catalyst material that does not have snowball morphology.

Isomorphously Substituted Molecular Sieves

Example 7

An isomorphously substituted zeolitic material (Na-[Ti]CHA) was prepared from an $0.03Al_2O_3:SiO_2:0.07TiO_2:0.06Na_2O:0.08ATMAOH:2.33H_2O$ gel composition through autoclave hydrothermal synthesis at 155° C. for 5 days. The product was recovered by filtration, and the template was removed by calcination at 600° C. for 5 hours. The final crystalline material had an x-ray powder diffraction pattern indicating >90% CHA phase and a silica/alumina ratio (SAR) of 25 by XRF.

Example 8

An isomorphously substituted zeolitic material (H-[Ti]CHA) was prepared by 500° C. calcination (4 hrs.) of $NH_4$-[Ti]CHA, which was obtained through double $NH_4NO_3$ (2.4 M) exchanges with the material of Example 7 (Na-[Ti]CHA). The Ti level is unchanged through the $NH_4NO_3$ exchange processes, 4.3% vs. 4.5%.

Example 9—Comparative

The zeolitic material H-CHA was prepared according to the process of Example 7 (H-[Ti]CHA), but without Ti addition to the synthesis gel.

Example 10

A copper promoted isomorphously substituted zeolitic material (Cu2.72-[Ti]CHA) was prepared by ion exchange at 50° C. (2 hrs.) using the material of Example 8 (H-[Ti]CHA) and $Cu(OAc)_2$ (0.06 M), showing a Cu content of 2.72% (ICP).

Example 11

A copper promoted isomorphously substituted zeolitic material (Cu3.64-[Ti]CHA) was prepared by ion exchange at 50° C. (2 hrs.) using the material of Example 9 (H-[Ti]CHA) and $Cu(OAc)_2$ (0.125 M), showing a Cu content of 3.64% (ICP)

Example 12—Comparative

A standard copper promoted zeolitic material (Cu2.75-CHA) was prepared according to the process provided in U.S. Pat. No. 8,404,203B2, with comparable Cu content (2.75%) to Example 9. This material is provided as the reference for benchmarking.

Example 13—Comparative

A standard copper promoted zeolitic material (Cu3.84-CHA) was prepared according to the process provided in U.S. Pat. No. 8,404,203B2, with comparable Cu content (3.84%) to Example 10. This material is provided as the reference for aging benchmarking.

Example 14

Figure 12:
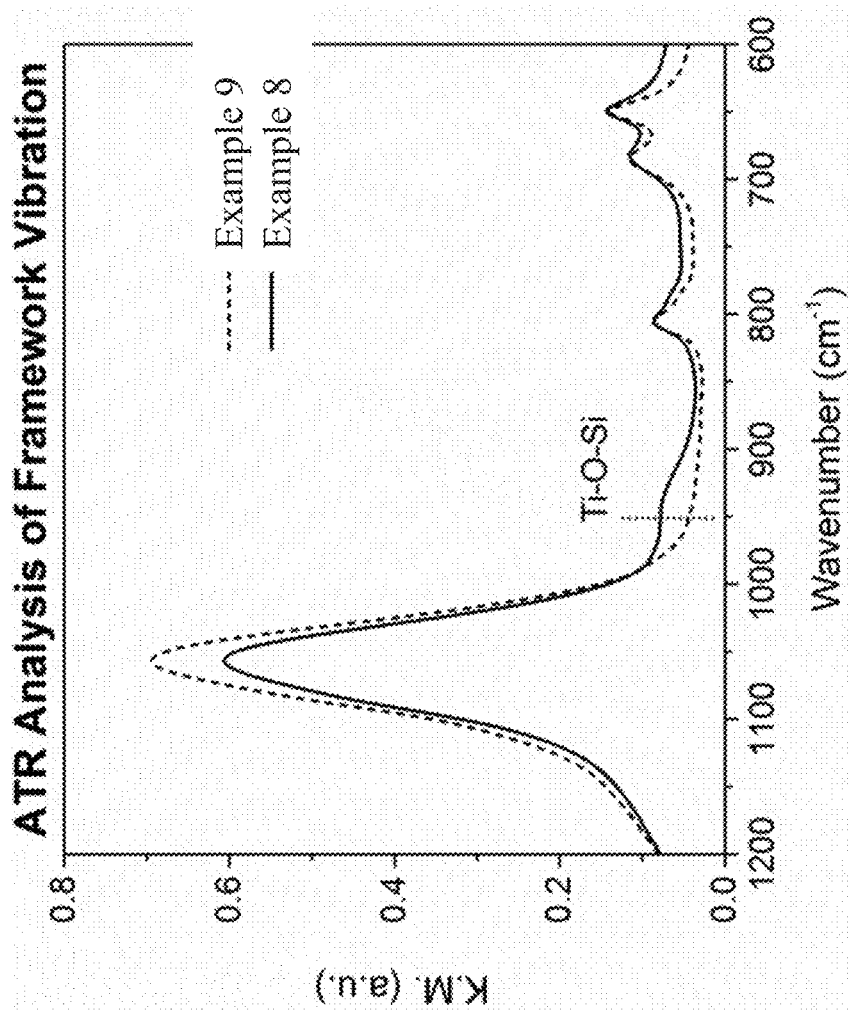
FIG. 12 is an ATR analysis for catalysts according to the Examples.

The incorporation of Ti at the tetrahedral position is evidenced by fingerprints of Ti involved framework stretches (Ti—O—Si) at 940-980 cm$^{-1}$, as illustrated in FIG. 12.

Example 15

Figure 13:
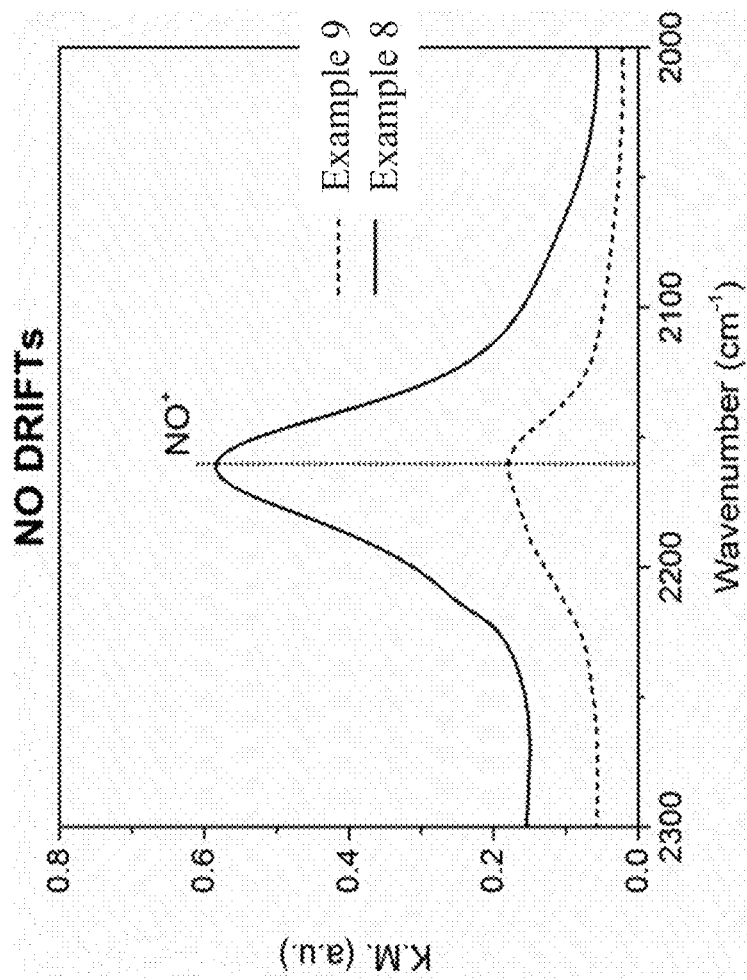
FIG. 13 is a FTIR analysis for catalysts according to the Examples.

In addition to the fingerprint vibrations from Ti involved framework stretches, the enhanced acidity of framework due to the high valence framework Ti(IV) is also evidenced from the increased intensity of NO$^+$, whose formation requires strong Lewis acidity, as illustrated in FIG. 13.

Example 16

Figure 14:
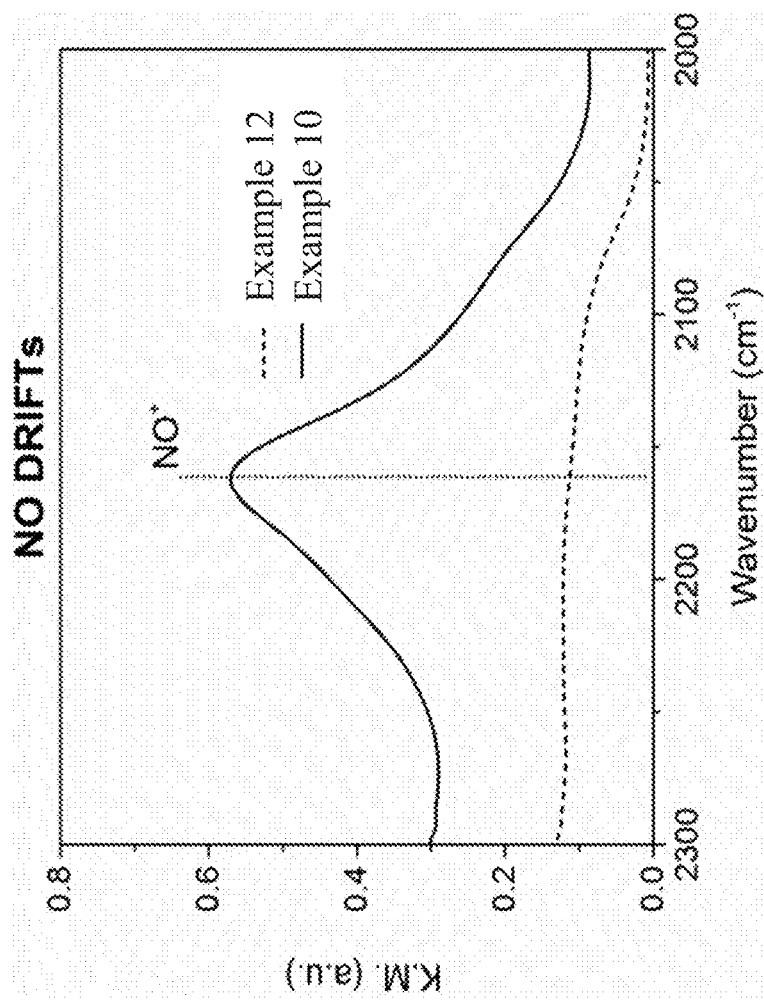
FIG. 14 is a FTIR analysis for catalysts according to the Examples.

After Cu was exchanged to acid sites of the isomorphously substituted zeolitic material [Ti]CHA providing the compounds of Examples 10 and 11, the formation of NO$^+$ is not affected. As illustrated in FIG. 14, the material of Example 10 (Cu2.72-[Ti]CHA) shows superior capability of generating more NO$^+$ compared to the unmodified Comparative Example 12 (Cu2.75-CHA) at an equilibrium state. Given the nature of high reactivity of NO$^+$ towards nucleophiles, e.g., NH$_3$, it is established that the observed significant reactivity boost at low temperatures (e.g., 200° C.) from Example 10 (Cu-[Ti]CHA) is due to the improved generation and retention of NO$^+$ over the catalyst.

Example 17

Figure 15:
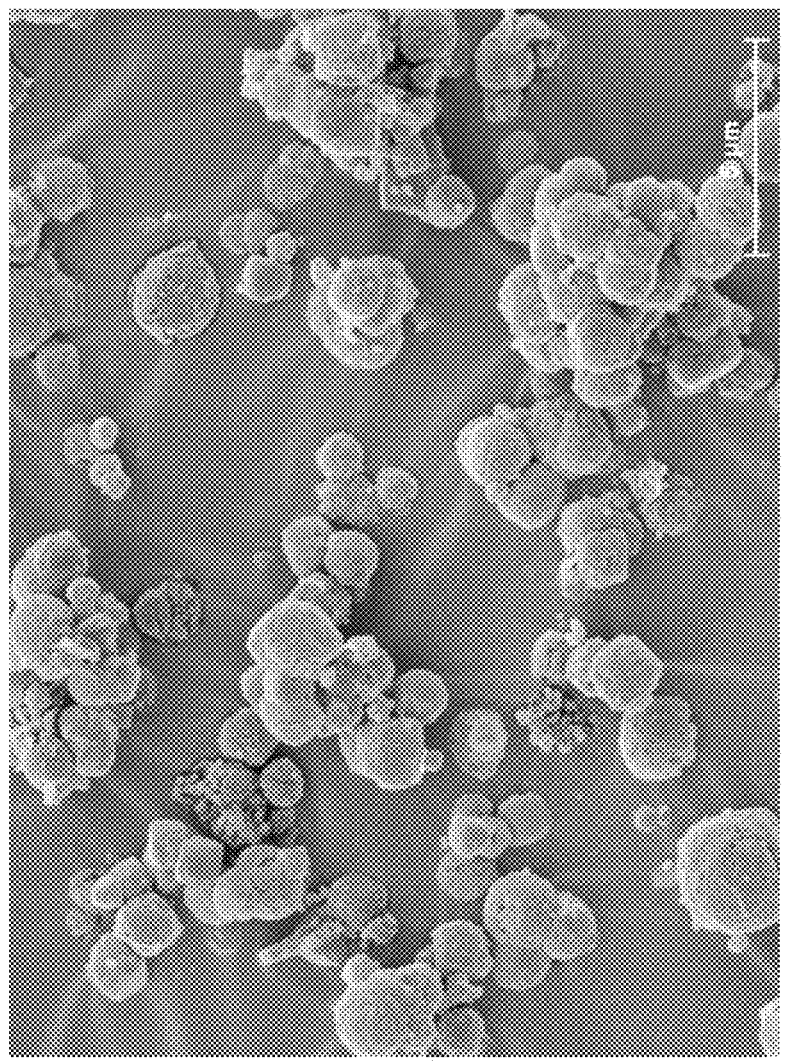
FIG. 15 is a scanning electron microscope image of material according to the Examples.

As can been observed in the SEM image in FIG. 15, the as-synthesized [Ti]CHA (Example 8) has a characteristic secondary structure as spheres with a diameter size of 1-2 μm, as identified by SEM analysis (secondary electron imaging) at a scale of 5000×.

Example 18

The material of Example 10 (Cu-[Ti]CHA) was washcoated on a flow-through ceramic substrate at a loading of 2.1 g/in$^3$. The typical SCR testing condition includes simulated diesel exhaust gas (500 ppm NO, 500 ppm NH$_3$, 10% O$_2$, 5% H$_2$O, and balance N$_2$) and temperature points from 200° C. to 600° C. Conversion of NO and NH$_3$ at various temperatures are monitored by FTIR. An aging condition of 750° C. exposure to 10% H$_2$O for 5 hrs. is adopted if desired to evaluate long term hydrothermal durability.

Figure 18A:
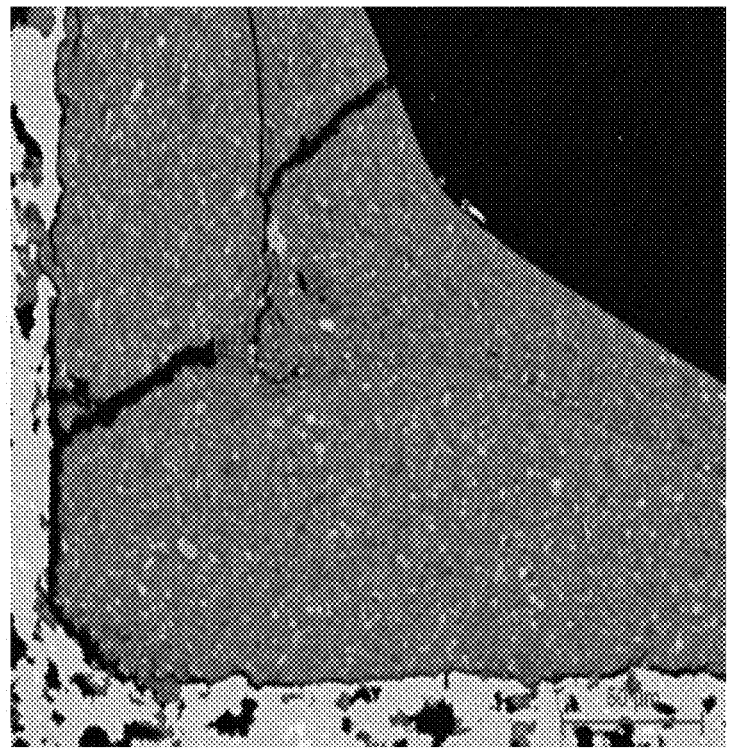
FIGS. 18A and 18B are scanning electron microscope images of material of materials according to the Examples.
Figure 18B:
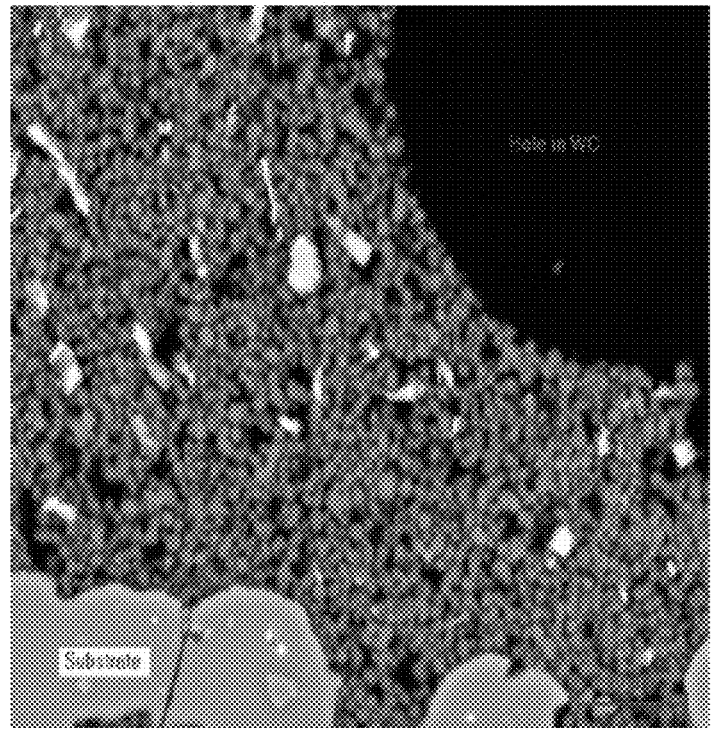

As illustrated in the SEM images in FIGS. 18A and 18B, the as-synthesized Cu-[Ti]CHA produces a washcoat that is very porous (FIG. 18B) when compared to a standard copper promoted zeolitic material, Cu-CHA.

Example 19

Figure 19:
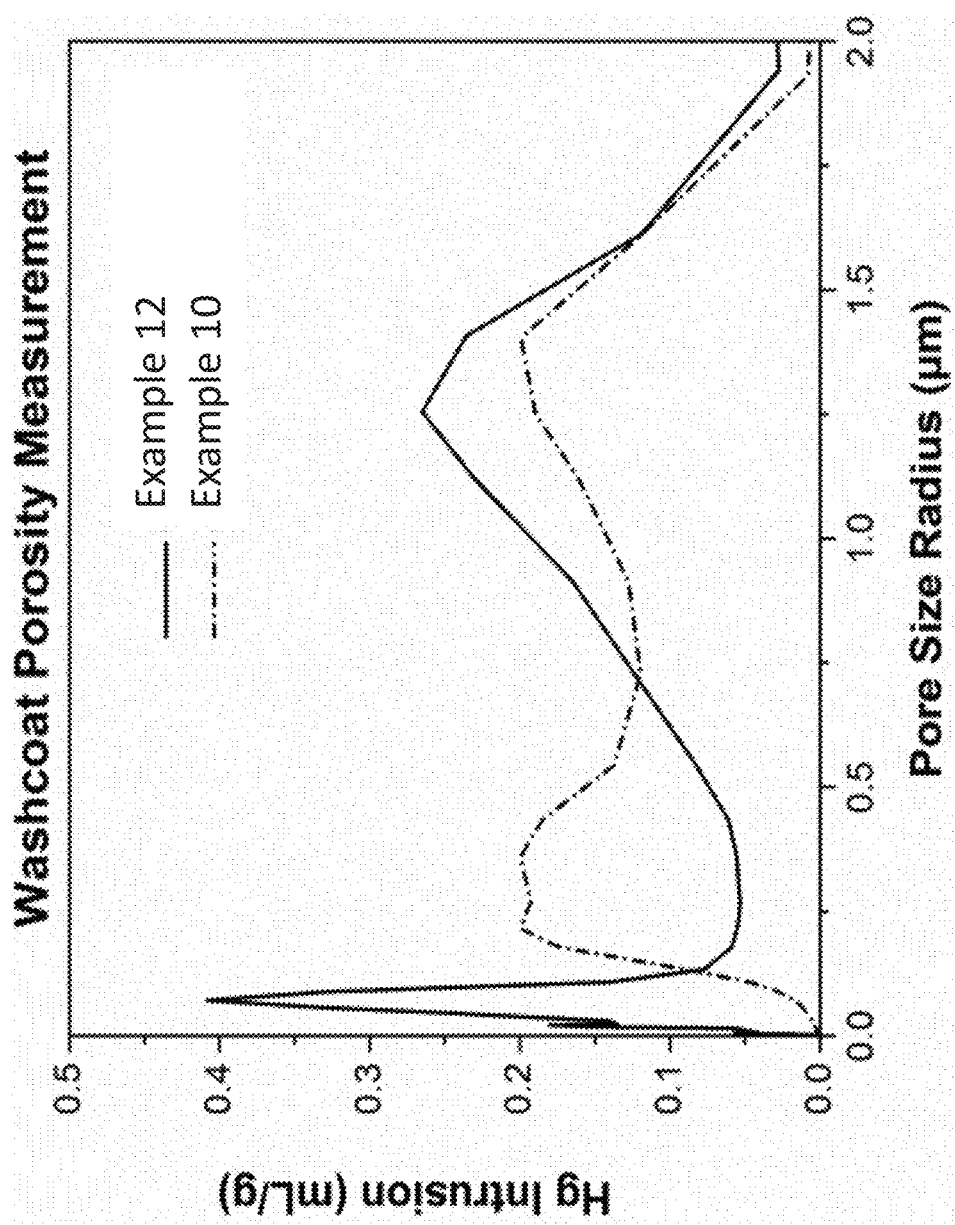
FIG. 19 is a washcoat porosity measurement for catalysts according to the Examples.

The porosity and particle size of the materials is presented in FIG. 19. As illustrated in FIG. 19, shown by Hg intrusion measurement, the washcoat formed from Cu-[Ti]CHA (Example 10) has a porosity distribution more towards larger pores compared to unmodified Cu-CHA (Example 12).

In addition to the increased porosity of the washcoat, the as-synthesized Cu-[Ti]CHA produces particle sizes that are significantly larger than the particle size of a standard copper promoted zeolitic material.

Example 20

Catalyst Cu-[Ti]CHA has been washcoated on a flow-through ceramic substrate at a loading of 2.1 g/in$^3$. A typical SCR testing condition includes simulated diesel exhaust gas (500 ppm NO, 500 ppm NH$_3$, 10% O$_2$, 5% H$_2$O, and balance N$_2$) and temperature points from 200° C. to 600° C. Conversion of NO and NH$_3$ at various temperatures are monitored by FTIR. An aging condition of 750° C. exposure to 10% H$_2$O for 5 hrs. is adopted if desired to evaluate long term hydrothermal durability.

Figure 16:
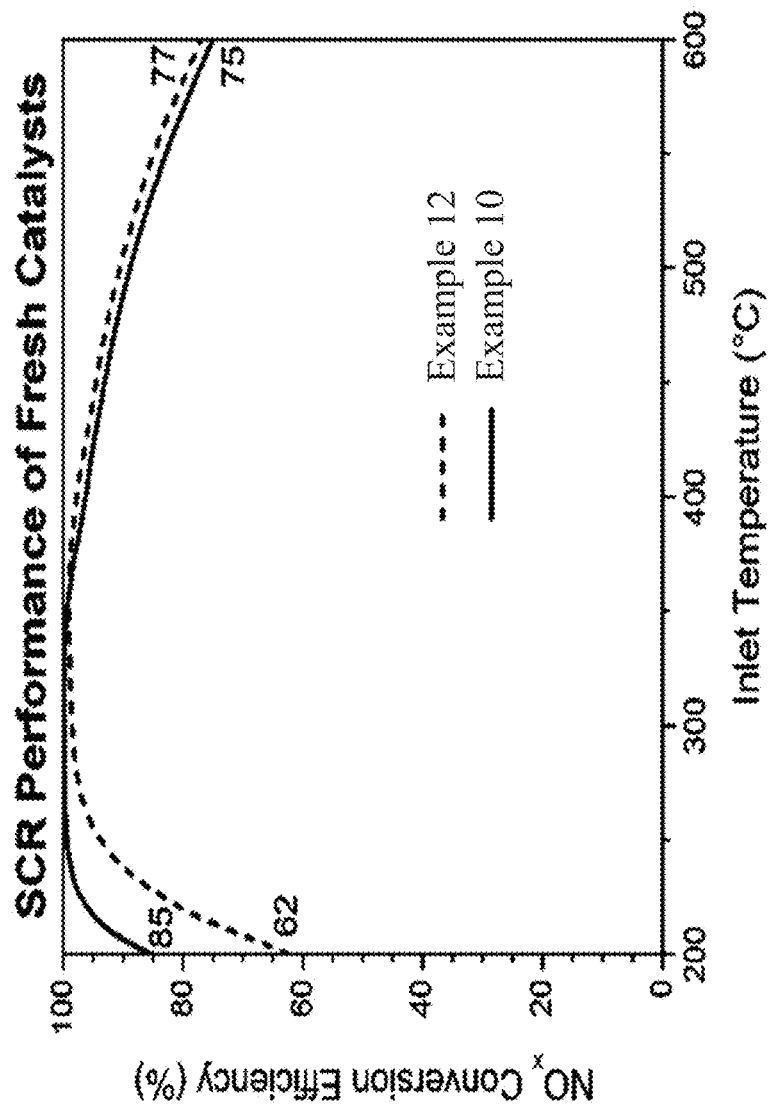
FIG. 16 compares $NO_x$ conversion for catalysts according to the Examples.

As illustrated in FIG. 16, with the assistance of framework Ti (Example 10), the SCR performance at 200° C. is significantly improved compared to the analogous sample without Ti (Example 6) at comparable Cu %, and no sacrifice of the high temperature (600° C.) NO$_x$ conversion efficiency is observed.

Example 21

Figure 17:
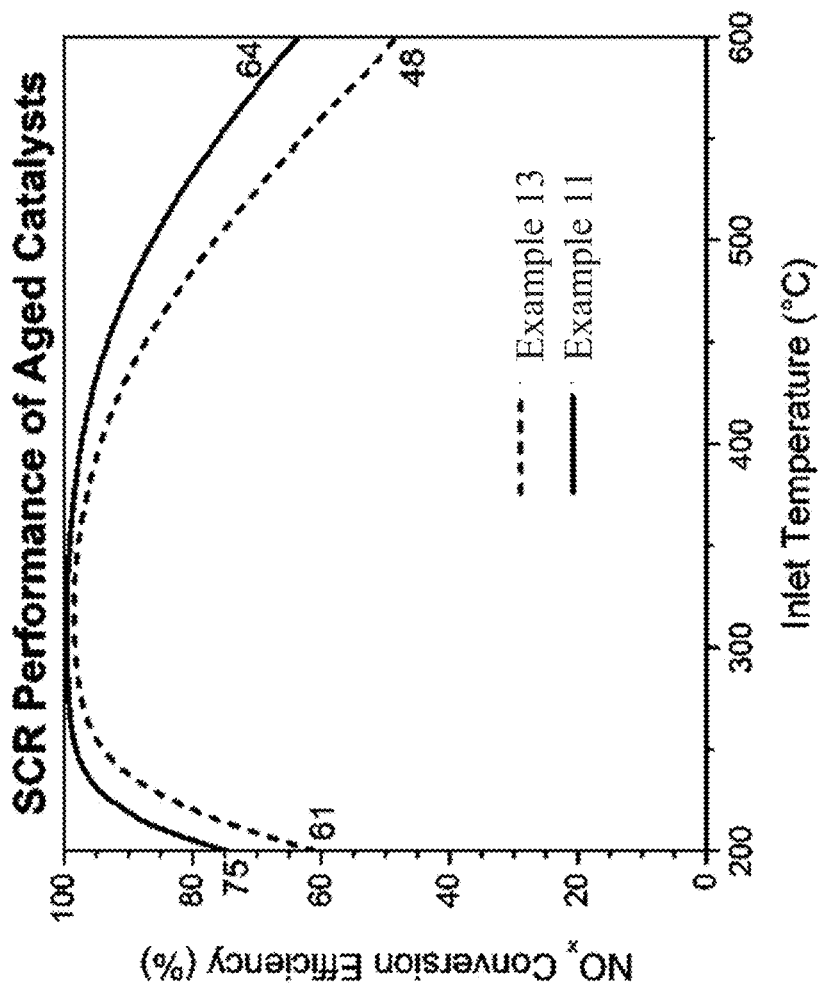
FIG. 17 compares $NO_x$ conversion for catalysts according to the Examples.

As illustrated in FIG. 17, high Cu content (e.g., Cu %>2.5% @ SAR=30), after high temperature hydrothermal aging, results in the formation of CuO, which actively consumes NH$_3$ leading to a decreased SCR performance at the high temperature end. The presence of framework Ti (Example 11) helps to alleviate the NH$_3$ consumption at the high temperature region with high Cu loaded sample.

Example 22

An isomorphously substituted zeolitic material (Na-[Ti]AEI) is prepared analogously to the material of Example 7. The product is recovered by filtration, and the template is removed by calcination at 600° C. for 5 hours.

Example 23

An isomorphously substituted zeolitic material (H-[Ti]AEI) is prepared by 500° C. calcination (4 hrs.) of NH$_4$-[Ti]AEI, which is obtained through double NH$_4$NO$_3$ (2.4 M) exchanges with the material of Example 21 (Na-[Ti]AEI).

Example 24

A copper promoted isomorphously substituted zeolitic material (Cu-[Ti]AEI) is prepared by ion exchange at 50° C. (2 hrs.) using the material of Example 22 (H-[Ti]AEI) and Cu(OAc)$_2$ (0.06 M).

Example 25

An isomorphously substituted zeolitic material (Na-[Ti]AFX) is prepared analogously to the material of Example 7. The product is recovered by filtration, and the template is removed by calcination at 600° C. for 5 hours.

Example 26

An isomorphously substituted zeolitic material (H-[Ti]AFX) is prepared by 500° C. calcination (4 hrs.) of NH$_4$-[Ti]AFX, which is obtained through double NH$_4$NO$_3$ (2.4 M) exchanges with the material of Example 24 (Na-[Ti]AFX).

Example 27

A copper promoted isomorphously substituted zeolitic material (Cu-[Ti]AFX) is prepared by ion exchange at 50° C. (2 hrs.) using the material of Example 25 (H-[Ti]AFX) and Cu(OAc)$_2$ (0.06 M).

Example 28

An isomorphously substituted zeolitic material (Na-[Ti]CHA) was prepared from an 0.03Al$_2$O$_3$:SiO$_2$:0.07TiO$_2$: 0.06Na$_2$O:0.08ATMAOH:2.33H$_2$O gel composition through autoclave hydrothermal synthesis at 155° C. for 5 days. The product was recovered by filtration, and the template was removed by calcination at 600° C. for 5 hours. The final crystalline material had an X-ray powder diffraction pattern indicating >90% CHA phase and a SAR of 25 by XRF. Other SAR, e.g., 20, can also be obtained by proper adjustment of Si/Al ratio in the starting gel.

Example 29

An isomorphously substituted zeolitic material (H-[Ti] CHA) was prepared by 500° C. calcination (4 hrs) of $NH_4$-[Ti]CHA, which was obtained through double $NH_4NO_3$ (2.4 M) exchanges with the material of Example 27 (Na-[Ti]CHA). The Ti level was unchanged through the $NH_4NO_3$ exchange processes, 4.3% vs. 4.5%.

Example 30

The zeolitic material H-CHA was prepared according to the process of Example 28 and 29, but without Ti addition to the initial synthesis sol gel for zeolite hydrothermal crystallization.

Example 31

A copper promoted isomorphously substituted zeolitic material (Cu-[Ti]CHA (SAR 20)) was prepared by ion exchange at 50° C. (2 hrs) using the material of Example 29 (H-[Ti]CHA) and $Cu(OAc)_2$. Variation of Cu concentration in the exchange process produced a series of copper zeolite, e.g., Cu2.46-[Ti]CHA (Example 31a), Cu3.03-[Ti]CHA (Example 31b), Cu3.64-[Ti]CHA (Example 31c), and Cu3.78-[Ti]CHA (Example 31d) (numbers after Cu denote Cu percentage).

Example 32

A standard copper promoted zeolitic material (Cu2.75-CHA) was prepared according to the process provided in U.S. Pat. No. 8,404,203B2, and was provided as the reference for benchmarking.

Example 33—Comparative

A Fe-CHA (Fe: 2.5%) was synthesized similarly as Cu-CHA but using $Fe(NO_3)_3$ in the solution exchange, and was selected as a comparative sample.

Example 34—Comparative

A commercially available Fe-Beta from BASF was selected as a comparative sample.

Example 35—Comparative

A commercially available Fe-MFI (SCP-306) from Süd-Chemie was selected as a comparative sample.

Example 36

Figure 20:
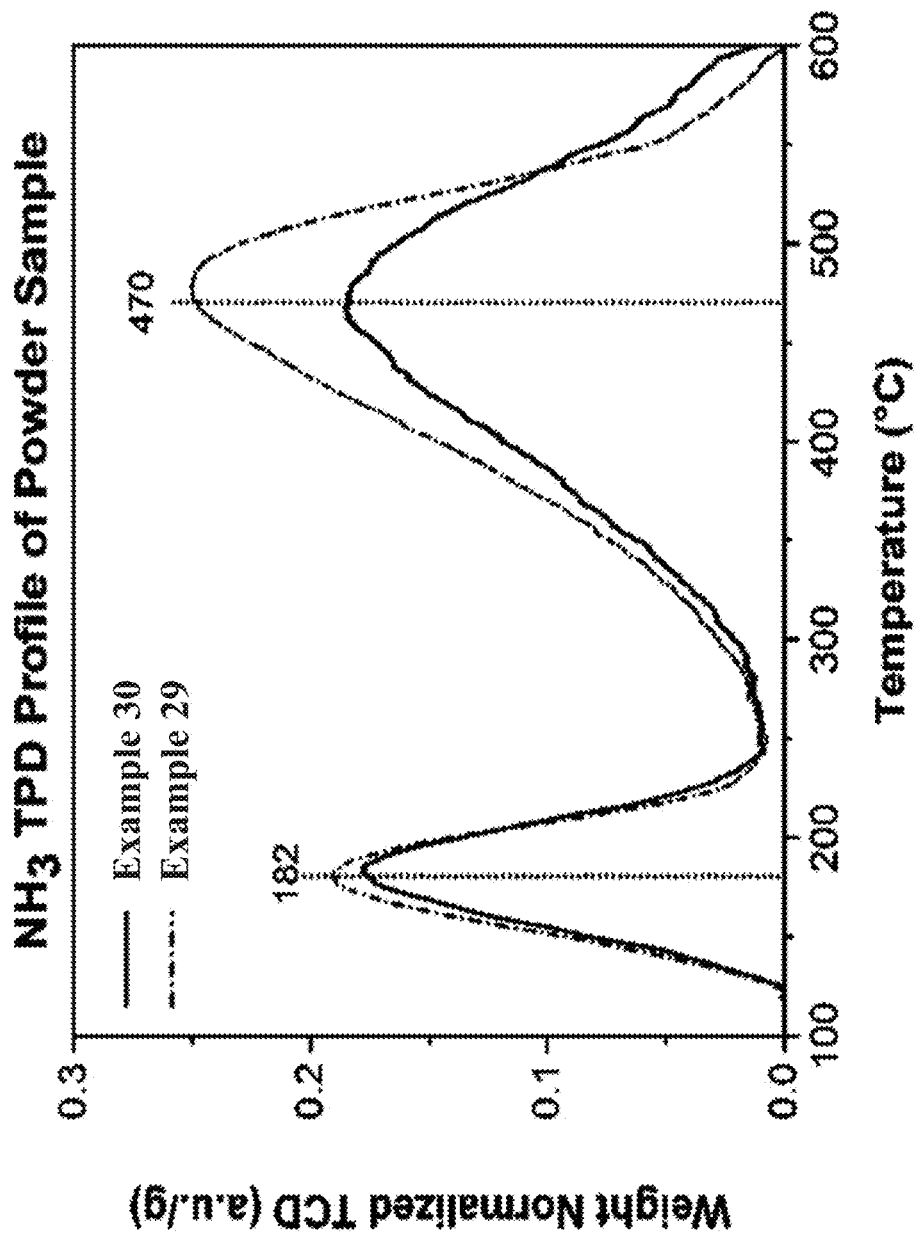
FIG. 20 compares $NH_3$ absorption for catalysts according to the Examples.

As illustrated in FIG. 20, in the presence of framework Ti, not only was the adsorbed $NH_3$ increased from 15.2 to 19.1 $cm^3/g$ at the high temperature zone, but also the desorption temperature was increased slightly by 10° C. (e.g., 470° C. to 480° C.), indicating a stronger Lewis acid site other than acidic proton functioning as the $NH_3$ storage component. (Example 29 v. Example 30).

Example 37

Figure 21:
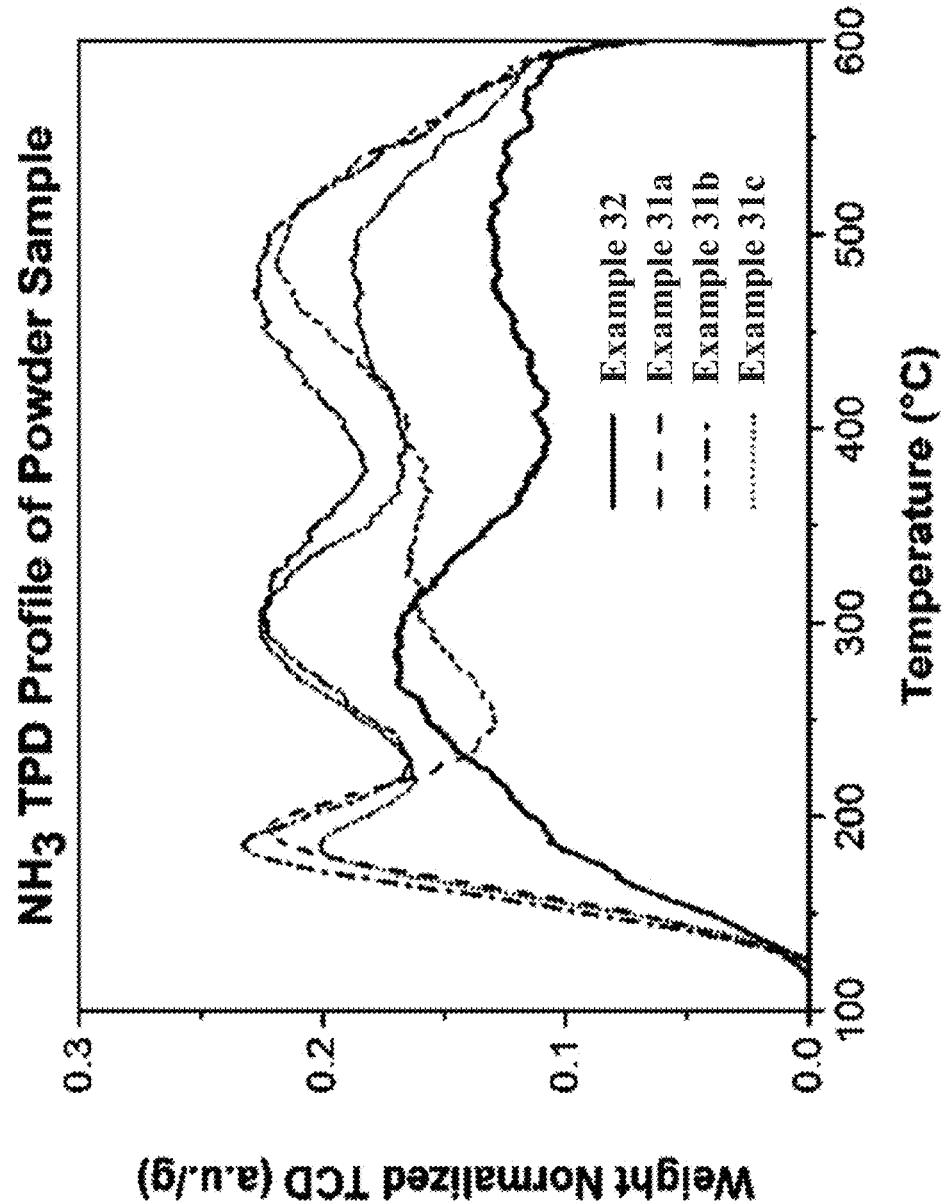
FIG. 21 compares $NH_3$ absorption for catalysts according to the Examples.

As illustrated in FIG. 21, after Cu exchange, an increase of Cu percentage only boosted the $NH_3$ storage in the mid-temperature zone, e.g., 250° C.-400° C. The integrated values for the highest desorption peak were 12.8, 23.8, 28.8, and 23.8 $cm^3/g$ for Cu-CHA (Example 32), Cu2.46-[Ti]CHA (Example 31a), Cu3.03-[Ti]CHA (Example 31b), Cu3.64-[Ti]CHA (Example 31c), respectively. The Ti containing Cu-[Ti]CHA samples consistently showed doubled capacity of $NH_3$ retention above 400° C. (Example 32 v. Example 31)

Example 38

Figure 22:
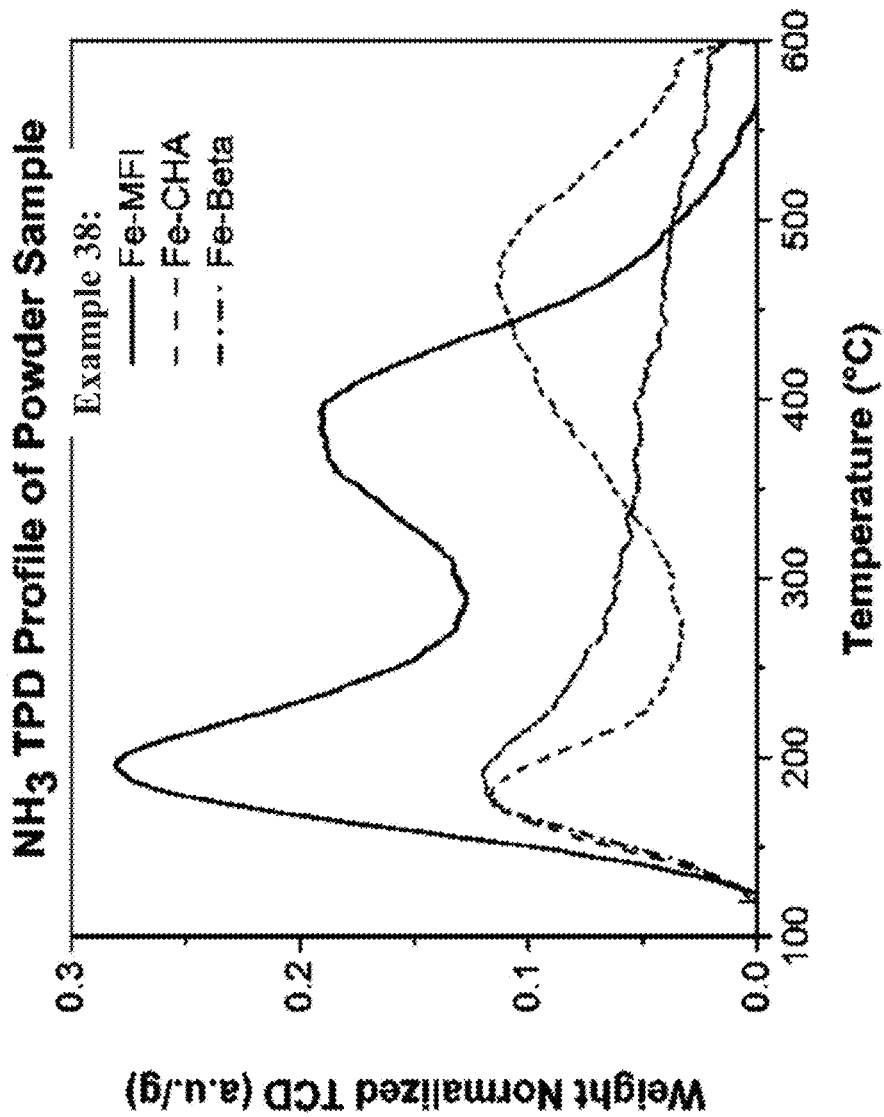
FIG. 22 compares $NH_3$ absorption for catalysts according to the Examples.

As illustrated in FIG. 22, the presence of other lower valence transition metals, e.g., Fe(III), however, did not have the effective promotion for $NH_3$ storage above 400° C. The high temperature (>400° C.) storage capacity for Fe-MFI, Fe-CHA, Fe-Beta were 13.6, 12.8, 7.9 $cm^3/g$, respectively, which were at a similar level as the unmodified Cu-CHA.

Example 39

Figure 23:
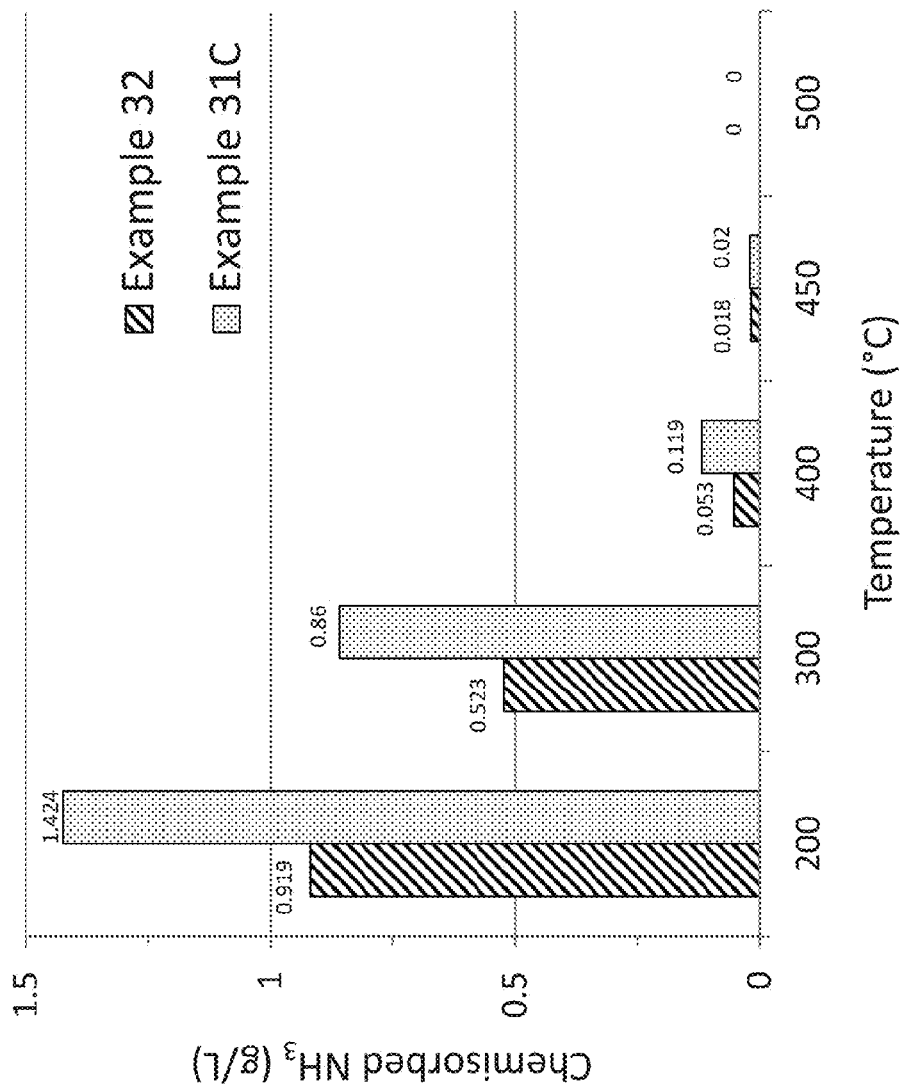
FIG. 23 compares $NH_3$ absorption for catalysts according to the Examples.

Both Cu-CHA (Example 32) and Cu3.64-[Ti]CHA (Example 31c) were coated on honeycomb with equal washcoat loading, and measured at temperatures (200° C., 300° C., 400° C., 450° C., and 500° C.) for $NH_3$ storage in the presence of 5% $H_2O$. As illustrated in FIG. 23, being assisted by framework Ti, more chemisorbed $NH_3$ were found consistently on Cu-[Ti]CHA than those on unmodified Cu-CHA up to 400° C.

Example 40

Figure 24:
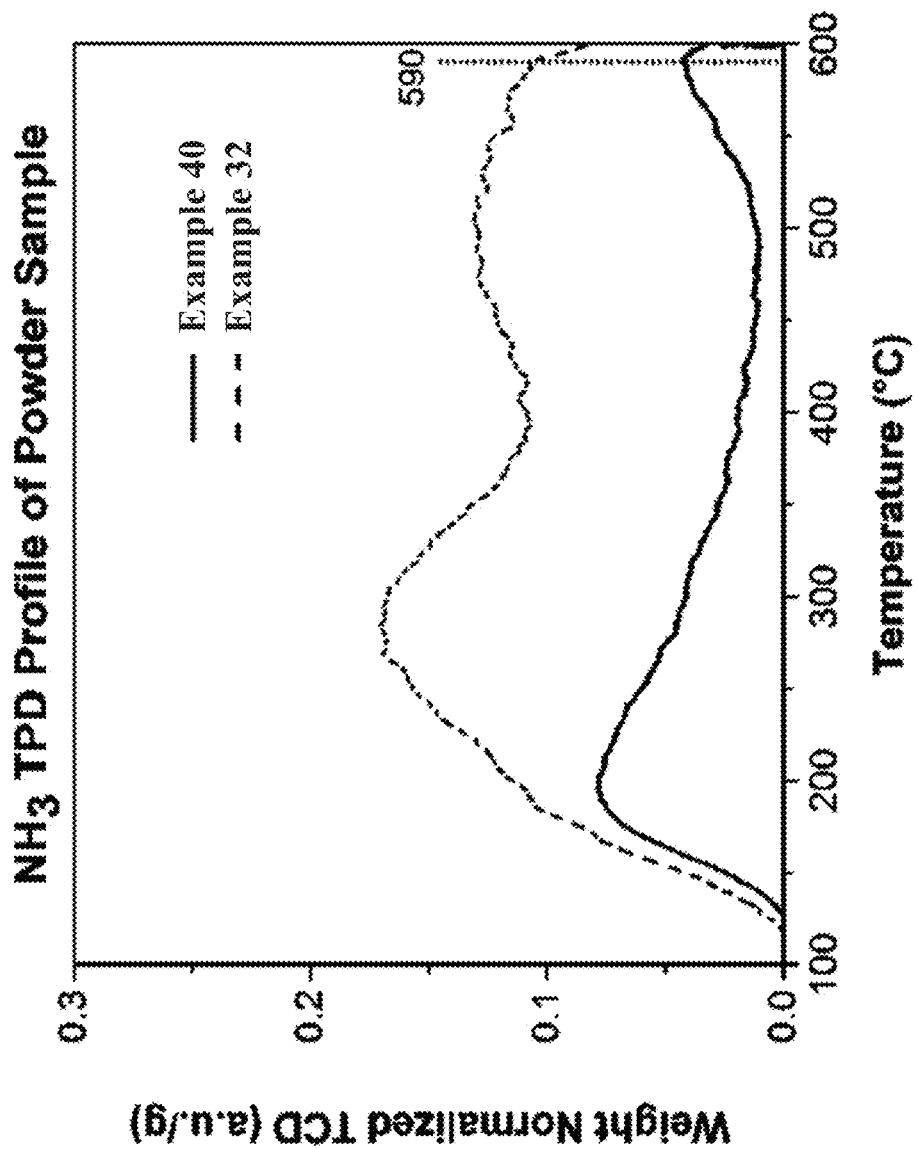
FIG. 24 compares $NH_3$ absorption for catalysts according to the Examples.

A commercially available non-zeolitic composite material with $TiO_2$, $Al_2O_3$, and $SiO_2$, consisting of Ti, Si, Al based oxides from a co-precipitation process, also demonstrated high temperature $NH_3$ storage feature. As illustrated in FIG. 24, although the storage capacity of the commercially available material compared to Cu-CHA (Example 32) was low, the desorption temperature was further increased.

Example 41

An isomorphously substituted zeolitic material (Na-[Ti] AEI) is prepared analogously to the material of Example 27. The product is recovered by filtration, and the template is removed by calcination at 600° C. for 5 hours.

Example 42

An isomorphously substituted zeolitic material (H-[Ti] AEI) is prepared by 500° C. calcination (4 hrs) of $NH_4$-[Ti] AEI, which is obtained through double $NH_4NO_3$ (2.4 M) exchanges with the material of Example 41 (Na-[Ti]AEI).

Example 43

A copper promoted isomorphously substituted zeolitic material (Cu-[Ti]AEI) is prepared by ion exchange at 50° C. (2 hrs) using the material of Example 42 (H-[Ti]AEI) and $Cu(OAc)_2$ (0.06 M).

Example 44

An isomorphously substituted zeolitic material (Na-[Ti] AFX) is prepared analogously to the material of Example 27. The product is recovered by filtration, and the template is removed by calcination at 600° C. for 5 hours.

Example 45

An isomorphously substituted zeolitic material (H-[Ti]AFX) is prepared by 500° C. calcination (4 hrs) of NH$_4$-[Ti]AFX, which is obtained through double NH$_4$NO$_3$ (2.4 M) exchanges with the material of Example 44 (Na-[Ti]AFX).

Example 46

A copper promoted isomorphously substituted zeolitic material (Cu-[Ti]AFX) is prepared by ion exchange at 50° C. (2 hrs) using the material of Example 45 (H-[Ti]AFX) and Cu(OAc)$_2$ (0.06 M).

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method for selectively reducing nitrogen oxide (NOx), the method comprising
   contacting an exhaust gas stream containing NOx with a selective catalytic reduction material comprising a spherical particle,
   wherein the spherical particle has a median particle size of about 0.5 to about 5 microns and comprises an agglomeration of crystals of a molecular sieve,
   wherein the spherical particle has a monodispersed snowball structure defined as an arrangement of crystals,
   wherein the crystals have approximately the same crystal size, wherein the same crystal size is selected from the range of about 1 to about 250 nm,
   wherein the molecular sieve has a structure type selected from the group consisting of AEI, AFT, AFX, CHA, EAB, EMT, ERI, GME, JSR, KFI, LEV, LTL, LTN, MOZ, MSO, MWW, OFF, SAS, SAT, SAV, SBS, SBT, SFW, SSF, SZR, TSC, WEN, and combinations thereof, and
   wherein the molecular sieve is promoted with a metal selected from Cu, Fe, Co, Ni, La, Ce, Mn, V, Ag, and combinations thereof.

2. The method of claim 1, wherein the molecular sieve comprises a d6r unit.

3. The method of claim 2, wherein the molecular sieve has a structure type selected from AEI, AFT, AFX, CHA, EAB, ERI, KFI, LEV, SAS, SAT, and SAV.

4. The method of claim 3, wherein the molecular sieve has a structure type selected from AEI, CHA, and AFX.

5. The method of claim 4, wherein the molecular sieve has the CHA structure type.

6. The method of claim 5, wherein the molecular sieve having the CHA structure type is selected from an aluminosilicate zeolite, a borosilicate, a gallosilicate, a SAPO, an ALPO, a MeAPSO, and a MeAPO.

7. The method of claim 5, wherein the molecular sieve having the CHA structure type is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

8. The method of claim 7, wherein the molecular sieve is selected from SSZ-13 and SSZ-62.

9. The method of claim 5, wherein the molecular sieve having the CHA structure type has a silica to alumina ratio in the range of 10 to 100.

10. The method of claim 1, wherein the molecular sieve is promoted with a metal selected from Cu, Fe, and combinations thereof.

11. The method of claim 1, wherein the selective catalytic reduction material is effective to catalyze the selective catalytic reduction of nitrogen oxides in the presence of a reductant at temperatures between 200° C. and 600° C.

12. The method of claim 1, wherein the metal is present in an amount in a range of about 0.1 to about 10 wt. % on an oxide basis.

13. The method of claim 1, wherein the spherical particle has a median particle size in the range of about 1.2 to about 3.5 microns.

14. The method of claim 1, wherein the crystals have a crystal size in the range of about 100 to about 250 nm.

15. The method of claim 1, wherein the selective catalytic reduction material is in the form of a washcoat.

16. The method of claim 15, wherein the washcoat is a layer deposited on a substrate.

17. The method of claim 16, wherein the substrate comprises a filter.

18. The method of claim 17, wherein the filter is a wall flow filter.

19. The method of claim 16, wherein the substrate is a flow through substrate.

20. The method of claim 1, wherein at least 80% of the spherical particles have a median particle size in the range of 0.5 to 2.5 micron.

21. The method of claim 1, wherein the molecular sieve comprises a zeolitic framework material of silicon and aluminum atoms, wherein a fraction of the silicon atoms are isomorphously substituted with a tetravalent metal.

22. The method of claim 21, wherein the tetravalent metal comprises a tetravalent transition metal.

23. The method of claim 22, wherein the tetravalent transition metal is selected from the group consisting of Ti, Zr, Hf, Ge, and combinations thereof.

24. The method of claim 22, wherein the tetravalent transition metal comprises Ti.

\* \* \* \* \*